US012467056B2

(12) United States Patent
Davis et al.

(10) Patent No.: US 12,467,056 B2
(45) Date of Patent: Nov. 11, 2025

(54) PLANT REGULATORY ELEMENTS AND USES THEREOF

(71) Applicant: Monsanto Technology LLC, St. Louis, MO (US)

(72) Inventors: Ian W. Davis, Durham, NC (US); Matthew S. Marengo, Wildwood, MO (US); Ervin D. Nagy, South Holland (NL)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 17/731,856

(22) Filed: Apr. 28, 2022

(65) Prior Publication Data

US 2022/0372502 A1    Nov. 24, 2022

Related U.S. Application Data

(60) Provisional application No. 63/295,061, filed on Dec. 30, 2021, provisional application No. 63/182,288, filed on Apr. 30, 2021.

(51) Int. Cl.
*C12N 15/82* (2006.01)
(52) U.S. Cl.
CPC .................. *C12N 15/8213* (2013.01)
(58) Field of Classification Search
None
See application file for complete search history.

(56) References Cited

U.S. PATENT DOCUMENTS

| | | |
|---|---|---|
| 2006/0282911 A1 | 12/2006 | Bull et al. |
| 2017/0166912 A1 | 6/2017 | Brower-Toland et al. |
| 2019/0330647 A1 | 10/2019 | Yang et al. |
| 2020/0056196 A1 | 2/2020 | Davis et al. |
| 2020/0080096 A1 | 3/2020 | Flasinski et al. |

FOREIGN PATENT DOCUMENTS

| | | |
|---|---|---|
| CN | 111019946 | 4/2020 |
| WO | 2010002984 A1 | 1/2010 |
| WO | 2016061481 A1 | 4/2016 |
| WO | 2020191248 A1 | 9/2020 |
| WO | 2021041001 A2 | 3/2021 |

OTHER PUBLICATIONS

Schramm et al., 2002, Genes and Development 16: 2593-2620 (Year: 2002).*
Connelly et al., 1994, Molecular and Cellular Biology, 14: 5910-5919 (Year: 1994).*
Zhang et al., 2017, Bio-Protocol 7: 2148 (Year: 2017).*
Jiang et al 2013, Nucleic Acids Research 41:e188 (Year: 2013).*
Zhang et al Mar. 29, 2021, Nature Communications 12:1944, pp. 1-11 (Year: 2021).*
Li et al 2018, Journal of Experimental Biology 69: 4715-4721 (Year: 2018).*
Hao et al 2020, Science China Life Sciences 63: DOI: 10.1007/s11427-019-1612-6 (Year: 2020).*
Zhang et al 2021, Nature Communications 12:1944, pp. 1-11; published Mar. 29, 2021 (Year: 2021).*
Burstein, et al. New CRISPR-Cas systems from uncultivated microbes. Nature 542, 237-241 (2017).
Gaudelli, et al. Programmable base editing of A•T to G•C in genomic DNA without DNA cleavage. Nature 551, 464-471 (2017).
Hellens, et al. A guide to Agrobacterium binary Ti vectors. Trends in Plant Science, vol. 5, Issue 10, pp. 446-451, (2000).
Komor, et al. Programmable editing of a target base in genomic DNA without double-stranded DNA cleavage. Nature 533, 420-424 (2016).
Komor, et al. Improved base excision repair inhibition and bacteriophage Mu Gam protein yields C:G-to-T:A base editors with higher efficiency and product purity. Science Advances, vol. 3, Issue 8, (2017).
Rees, et al. Base editing: precision chemistry on the genome and transcriptome of living cells. Nat Rev Genet 19, 770-788 (2018).
Strecker, et al. RNA-guided DNA insertion with CRISPR-associated transposases. Science, vol. 365, Issue 6448, pp. 48-53, (2019).
Tang, et al. A Single Transcript CRISPR-Cas9 System for Efficient Genome Editing in Plants. Molecular Plant, vol. 9, pp. 1088-1091, (2016).
Tsai, et al. Dimeric CRISPR RNA-guided FokI nucleases for highly specific genome editing. Nat Biotechnol 32, 569-576 (2014).
Vignols, et al. The brown midrib3 (bm3) mutation in maize occurs in the gene encoding caffeic acid O-methyltransferase., The Plant Cell, vol. 7, Issue 4, pp. 407-416, Apr. 1995.
Westra, et al. The CRISPRs, They Are A-Changin': How Prokaryotes Generate Adaptive Immunity. Annual Review of Genetics, vol. 46, pp. 311-339, (2012).
Zetsche, et al. Cpf1 Is a Single RNA-Guided Endonuclease of a Class 2 CRISPR-Cas System. Cell, vol. 163, pp. 759-771, (2015).
International Search Report and Written Opinion regarding International App. No. PCT/US22/26754, mailed Oct. 11, 2022.
GenBank Accession No. XM_025548853, dated Feb. 3, 2020.
Sugano et al., CRISPR/Cas9-mediated targeted mutagenesis in the liverwort Marchantia polymorpha L, Plant Cell Physiol. 55(3):475-481, 2014.

(Continued)

*Primary Examiner* — Brent T Page
*Assistant Examiner* — Aleksandar Radosavljevic
(74) *Attorney, Agent, or Firm* — Dentons US LLP; Judith Koehler

(57) ABSTRACT

The invention provides novel synthetic small nuclear RNA (snRNA) promoters which are useful for CRISPR-mediated targeted gene modifications in plants. The invention also provides methods and compositions for use for the snRNA promoters driving expression of guide RNAs and non-coding RNAs for development of plants and plant cells comprising modified genomes.

27 Claims, No Drawings

Specification includes a Sequence Listing.

(56) References Cited

OTHER PUBLICATIONS

Nakamura. International Preliminary Report on Patentability regarding International App. No. PCT/US2022/026754, mailed on Nov. 9, 2023.
Extended European Search Report regarding EP App. No. 22796734.6, mailed Feb. 24, 2025.

* cited by examiner

PLANT REGULATORY ELEMENTS AND USES THEREOF

REFERENCE TO RELATED APPLICATIONS

This application claims the benefit of United States provisional application Nos. 63/182,288, filed Apr. 30, 2021 and 63/295,061 filed Dec. 30, 2021, all herein incorporated by reference in their entirety.

INCORPORATION OF SEQUENCE LISTING

The sequence listing that is contained in the file named "MONS492US-sequence_listing.txt", which is 37,443 bytes (as measured in Microsoft Windows®) and was created on Apr. 28, 2022, is filed herewith by electronic submission and is incorporated by reference herein.

FIELD OF THE INVENTION

The disclosure relates to the field of biotechnology. More specifically, the disclosure provides novel synthetic plant promoters beneficial for the expression of, for instance, non-protein-coding small RNAs for CRISPR-mediated genome modification.

BACKGROUND

Site-specific recombination has potential for application across a wide range of biotechnology-related fields. Meganucleases, zinc finger nucleases (ZFNs), and transcription activator-like effector nucleases (TALENs) containing a DNA-binding domain and a DNA cleavage domain enable genome modification. While meganucleases, ZFNs, and TALENs, are effective and specific, these technologies require generation through protein engineering of one or more components for each genomic site chosen for modification. Advances in application of clustered, regularly interspaced, short palindromic repeats CRISPR have illustrated a method of genome modification that has the advantage of being quick to engineer.

The Clustered Regularly Interspersed Short Palindromic Repeats (CRISPR) system constitutes an adaptive immune system in prokaryotes that targets endonucleolytic cleavage of invading phage. The system is composed of a protein component (Cas) and a guide RNA (gRNA) that targets the Cas protein to a specific locus for endonucleolytic cleavage. This system has been successfully engineered to target specific loci for endonucleolytic cleavage of mammalian, zebrafish, drosophila, nematode, bacteria, yeast, and plant genomes.

It is preferable that the DNA sequence encoding the guide RNA be transcribed by RNA Polymerase III which transcribes small nuclear RNAs (snRNAs). Native promoters, such as the U6 snRNA promoters are often used to drive expression of gRNAs. Multiplex targeting experiments often rely on the same promoter driving each of the gRNAs. This can lead to technical problems when cloning or maintaining plasmids that comprise multiple U6/gRNA cassettes such as recombination events or deletions arising from the sequence redundancy amongst cassettes. Having multiple snRNA promoters with diverse DNA sequences will help alleviate this technical issue. Thus, the inventors disclose herein novel synthetic snRNA promoters that have little sequence homology with known native U6 snRNA promoters and each other. These novel synthetic snRNA promoters are capable of driving the expression of RNA polymerase III transcripts, such as gRNAs, in plant cells.

SUMMARY OF THE INVENTION

In one aspect, the invention provides a synthetic small nuclear RNA (snRNA) promoter comprising a DNA sequence selected from the group consisting of: (a) a sequence with at least 85% sequence identity to any of SEQ ID NOs:1-10; (b) a sequence comprising any of SEQ ID NOs:1-10; and (c) a fragment of any of SEQ ID NOs:1-10. In one embodiment, the synthetic snRNA promoter sequence has at least 90 percent sequence identity to the DNA sequence of any of SEQ ID NOs:1-10. In another embodiment, the synthetic snRNA promoter sequence has at least 95 percent sequence identity to the DNA sequence of any of SEQ ID NOs:1-10. In yet another embodiment, the synthetic snRNA promoter fragment comprises gene regulatory activity.

Another aspect of the invention provides a recombinant DNA construct comprising a synthetic snRNA promoter, operably linked to a DNA sequence encoding one or more guide RNAs (gRNAs), wherein the sequence of said synthetic snRNA promoter is selected from the group consisting of: (a) a sequence with at least 85% sequence identity to any of SEQ ID NOs:1-10; (b) a sequence comprising any of SEQ ID NOs:1-10; and (c) a fragment of any of SEQ ID NOs: 1-10, wherein the synthetic snRNA promoter is capable of expressing a gRNA. In some embodiments, the recombinant DNA construct further comprises a transcription termination sequence. In some embodiments, the recombinant DNA construct may also further comprise a DNA sequence encoding a promoter operably linked to a DNA sequence encoding a clustered, regularly interspaced, short palindromic repeat CRISPR-associated protein. In some embodiments, the CRISPR-associated protein is selected from a Type I CRISPR-associated protein, a Type II CRISPR-associated protein, a Type III CRISPR-associated protein, a Type IV CRISPR-associated protein, Type V CRISPR-associated protein, or a Type VI CRISPR-associated protein. In some embodiments, the CRISPR-associated protein is a synthetic CRISPR-associated protein. In certain embodiments of the recombinant DNA construct, the nucleotide sequence encoding the CRISPR-associated protein may be further operably linked to at least one nuclear localization sequence (NLS). Further, in certain embodiments of the contemplated recombinant DNA construct, the CRISPR-associated protein is selected from the group consisting of: Cast, Cas1B, Cas2, Cas3, Cas4, Cas5, Cas6, Cas7, Cas8, Cas9 (also known as Csn1 and Csx12), Cas10, Cas 12a (also known as Cpf1), Cas12b, Cas12d, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, CasX, CasY, and Mad7. In certain embodiments, the construct comprises flanking left and right homology arms (HA) which are each about 2 to 1200 bp in length. In particular embodiments, the homology arms are about 230 to about 1003 bp in length.

Another aspect of the invention provides a recombinant DNA construct comprising a first synthetic snRNA promoter, operably linked to a DNA sequence encoding one or more guide RNAs (gRNAs), and a second synthetic snRNA promoter, operably linked to a DNA sequence encoding one or more guide RNAs (gRNAs), wherein the sequences of said first and second synthetic snRNA promoter are selected independently from the group consisting of: (a) a sequence with at least 85% sequence identity to any of SEQ ID NOs:1-10; (b) a sequence comprising any of SEQ ID NOs:1-10; and (c) a fragment of any of SEQ ID NOs:1-10, wherein the fragment is capable of expressing a gRNA. In certain embodiments, the first synthetic snRNA promoter is different from the second synthetic snRNA promoter. In certain embodiments, the sequence encoding the one or more gRNAs expressed by the first synthetic snRNA promoter is distinct from the sequence encoding the one or more gRNAs expressed by the second synthetic snRNA promoter. In some embodiments, sequences encoding gRNAs further comprise sequences encoding one or more tRNAs as described in WO/2016/061481, which is incorporated herein in its entirety by reference. In certain embodiments, the construct comprises flanking left and right homology arms (HA) which are each about 2 to 1200 bp in length. In particular embodiments, the homology arms are about 230 to about 1003 bp in length. In some embodiments, the recombinant DNA construct further comprises a transcription termination sequence. In some embodiments, the recombinant DNA construct may also further comprise a DNA sequence encoding a promoter operably linked to a DNA sequence encoding a clustered, regularly interspaced, short palindromic repeat CRISPR-associated protein. In some embodiments, the CRISPR-associated protein is selected from a Type I CRISPR-Cas system, a Type II CRISPR-Cas system, a Type III CRISPR-Cas system, a Type IV CRISPR-Cas system, Type V CRISPR-Cas system, or a Type VI CRISPR-Cas system. In some embodiments, the CRISPR-associated protein is a synthetic CRISPR-associated protein. In certain embodiments of the recombinant DNA construct, the nucleotide sequence encoding the CRISPR-associated protein may be further operably linked to at least one nuclear localization sequence (NLS). Further, in certain embodiments of the contemplated recombinant DNA construct, the CRISPR-associated protein is selected from the group consisting of: Cas1, Cas1B, Cas2, Cas3, Cas4, Cas5, Cas6, Cas7, Cas8, Cas9 (also known as Csn1 and Csx12), Cas10, Cas 12a (also known as Cpf1), Cas12b, Cas12d, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, CasX, CasY, and Mad7.

Another aspect of the invention provides a recombinant DNA construct comprising a synthetic snRNA promoter, operably linked to a sequence encoding a non-coding RNA, wherein the sequence of said synthetic snRNA promoter is selected from the group consisting of: (a) a sequence with at least 85% sequence identity to any of SEQ ID NOs:1-10; (b) a sequence comprising any of SEQ ID NOs:1-10; and (c) a fragment of any of SEQ ID NOs:1-10, wherein the fragment comprises gene regulatory activity. In some embodiments, the non-coding RNA is selected from the group consisting of: a guide RNA (gRNA), a microRNA (miRNA), a miRNA precursor, a mature miRNA, a decoy miRNA as described in WO 2010/002984 incorporated herein by reference, a small interfering RNA (siRNA), a small RNA (22-26 nt in length) and precursor encoding same, a heterochromatic siRNA (hc-siRNA), a Piwi-interacting RNA (piRNA), a hairpin double strand RNA (hairpin dsRNA), a trans-acting siRNA (ta-siRNA), and a naturally occurring antisense siRNA (nat-siRNA). In some embodiments, the recombinant DNA construct comprising a synthetic snRNA promoter, operably linked to a sequence encoding two or more non-coding RNAs. In some embodiments, the sequence encoding the two or more non-coding RNAs further comprises sequence encoding one or more tRNAs.

Yet another aspect of the invention comprises a recombinant DNA construct comprising: a) a first synthetic snRNA promoter selected from the group consisting of: (a) a sequence with at least 85% sequence identity to any of SEQ ID NOs:1-10; (b) a sequence comprising any of SEQ ID NOs:1-10; and (c) a fragment of any of SEQ ID NOs:1-10, wherein the fragment comprises gene regulatory activity, operably linked to a DNA sequence encoding a non-coding RNA; and b) a second synthetic snRNA promoter selected from the group consisting of: (a) a sequence with at least 85% sequence identity to any of SEQ ID NOs:1-10; (b) a sequence comprising any of SEQ ID NOs:1-10; and (c) a fragment of any of SEQ ID NOs:1-10, wherein the fragment comprises gene regulatory activity, operably linked to a DNA sequence encoding a non-coding RNA, wherein the first synthetic snRNA promoter and the second synthetic snRNA promoter are different. In certain embodiments of the recombinant DNA construct, the sequence encoding the first synthetic snRNA promoter and the sequence encoding the second synthetic snRNA promoter each comprise any of SEQ ID NOs:1-10, or a fragment thereof, wherein the fragment comprises gene regulatory activity. Also contemplated are embodiments wherein the recombinant DNA construct further comprises a sequence specifying one or more additional synthetic snRNA promoters selected from the group consisting of: SEQ ID NOs:1-10, or a fragment thereof, wherein the fragment comprises gene regulatory activity, operably linked to a DNA sequence encoding a non-coding RNA, wherein the first synthetic snRNA promoter, the second synthetic snRNA promoter, and each of the one or more additional snRNA promoters are different. In certain embodiments, the recombinant DNA construct sequence specifying said one or more additional synthetic snRNA promoters is selected from the group consisting of: SEQ ID NOs:1-10, or a fragment thereof, wherein the fragment comprises gene regulatory activity. In yet in other embodiments the recombinant DNA construct comprises 3, 4, or 5 synthetic snRNA promoters. In some embodiments, the recombinant DNA construct comprises noncoding RNAs which are gRNAs targeting different selected target sites in a chromosome of a plant cell. In other contemplated embodiments, the recombinant DNA further comprises a DNA sequence encoding a promoter operably linked to a DNA sequence encoding an RNA guided endonuclease. In a further embodiment, the RNA guided endonuclease is a clustered, regularly interspaced, short palindromic repeat (CRISPR)-associated protein. In some embodiments, the CRISPR associated protein is selected from a Type I CRISPR-Cas protein, a Type II CRISPR-Cas protein, a Type III CRISPR-Cas protein, a Type IV CRISPR-Cas protein, Type V CRISPR-Cas protein, and a Type VI CRISPR-Cas protein. In some embodiments, the CRISPR-associated protein is a synthetic CRISPR-associated protein. In some embodiments, the CRISPR-associated protein is selected from Cas1, Cas1B, Cas2, Cas3, Cas4, Cas5, Cas6, Cas7, Cas8, Cas9 (also known as Csn1 and Csx12), Cas10, Cas 12a (also known as Cpf1), Cas12b, Cas12d, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, CasX, CasY, and Mad7.

Another aspect of the invention provides a cell comprising any of the recombinant DNA constructs described above. In certain embodiments, the cell is a plant cell. In some embodiments, the plant cell is a monocotyledonous plant cell. In other embodiments, the plant cell is a dicotyledonous plant cell. In yet another embodiment, the plant cell is selected from the group consisting of: a maize plant cell, a soybean plant cell, a cotton plant cell, a peanut plant cell, a barley plant cell, an oat plant cell, an orchard grass plant cell, a rice plant cell, a sorghum plant cell, a sugarcane plant cell, a tall fescue plant cell, a turfgrass plant cell, a wheat plant cell, an alfalfa plant cell, a canola plant cell, a cabbage plant cell, a mustard plant cell, a rutabaga plant cell, a turnip plant cell, a kale plant cell, a broccoli plant cell, a cauliflower plant cell, a pepper plant cell, a bean plant cell, a cowpea plant cell, a chickpea plant cell, a gourd plant cell, a lettuce plant cell, a cucumber plant cell, a melon plant cell, a carrot plant cell, a tomato plant cell, a radish plant cell, a potato plant cell, and an ornamental plant cell.

DESCRIPTION OF THE SEQUENCES

SEQ ID NO:1 is a DNA sequence of the synthetic snRNA promoter, P-GSP2262.

SEQ ID NO:2 is a DNA sequence of the synthetic snRNA promoter, P-GSP2268.

SEQ ID NO:3 is a DNA sequence of the synthetic snRNA promoter, P-GSP2269.

SEQ ID NO:4 is a DNA sequence of the synthetic snRNA promoter, P-GSP2272.

SEQ ID NO:5 is a DNA sequence of the synthetic snRNA promoter, P-GSP2273.

SEQ ID NO:6 is a DNA sequence of the truncation variant synthetic snRNA promoter P-GSP2262_TR, derived from P-GSP2262.

SEQ ID NO:7 is a DNA sequence of the truncation variant synthetic snRNA promoter P-GSP2268_TR, derived from P-GSP2268.

SEQ ID NO:8 is a DNA sequence of the truncation variant synthetic snRNA promoter P-GSP2269_TR, derived from P-GSP2269.

SEQ ID NO:9 is a DNA sequence of the truncation variant synthetic snRNA promoter P-GSP2272_TR, derived from P-GSP2272.

SEQ ID NO:10 is a DNA sequence of the truncation variant synthetic snRNA promoter P-GSP2273_TR, derived from P-GSP2273.

SEQ ID NO:11 is a DNA sequence of an EXP, EXP-Zm.UbqM1:1:9 comprised of a promoter, leader, and intron derived from a *Zea mays* ssp. *mexicana* ubiquitin gene.

SEQ ID NO:12 is a DNA sequence encoding a nuclear targeted Cas12a protein, Cas12a_NLS.

SEQ ID NO:13 is a DNA sequence of the 3' UTR, T-Os.LTP:2.

SEQ ID NO:14 is a DNA sequence of a guide RNA spacer, NR-Zm.Bmr3_2691.

SEQ ID NO:15 is a DNA sequence of a guide RNA, gRNA-Zm.Bmr3_2691.

SEQ ID NO:16 is a DNA sequence of a guide RNA spacer, NR-Zm.Bmr3_3170.

SEQ ID NO:17 is a DNA sequence of a guide RNA, gRNA-Zm.Bmr3_3170.

SEQ ID NO:18 is a DNA sequence of the *Zea mays* brown midrib 3 (Bmr3) genomic region targeted for genome editing.

SEQ ID NO:19 is the amino acid sequence of Cas12a_NLS encoded by SEQ ID NO:12.

SEQ ID NO:20 is a DNA sequence of a guide RNA spacer, NR-Zm.Bmr3_90.

SEQ ID NO:21 is a DNA sequence of a guide RNA spacer, NR-Zm.Bmr3_227.

SEQ ID NO:22 is a DNA sequence of a guide RNA spacer, NR-Zm.Bmr3_3279.

SEQ ID NO:23 is a DNA sequence of a guide RNA, gRNA-Zm.Bmr3_90_3279.

SEQ ID NO:24 is a DNA sequence of a guide RNA, gRNA-Zm.Bmr3_227_3279.

SEQ ID NO:25 is a DNA sequence of a guide RNA, gRNA-Zm.Bmr3_2691_2.

SEQ ID NO:26 is a DNA sequence of a guide RNA, gRNA-Zm.Bmr3_3170_2.

SEQ ID NO:27 is a DNA sequence of a guide RNA, gRNA-Zm.Bmr3_2691_3170.

SEQ ID NO:28 is a DNA sequence of the *Zea mays* Zm7 genomic region targeted for genome editing.

SEQ ID NO:29 is a DNA sequence of a guide RNA spacer, NR-Zm.7.1b.

SEQ ID NO:30 is a DNA sequence of a guide RNA, gRNA-Zm.7.1b.

SEQ ID NO:31 is a DNA sequence of a guide RNA spacer, NR-Zm.7.1c.

SEQ ID NO:32 is a DNA sequence of a guide RNA, gRNA-Zm.7.1c.

SEQ ID NO:33 is a DNA sequence of a guide RNA, gRNA-7.1c_7.1b.

DETAILED DESCRIPTION

Provided herein are novel synthetic snRNA (small nuclear RNA) promoters having activity in plants. The nucleotide sequences of these small nuclear RNA promoters are provided as SEQ ID NOs:1-10. These small nuclear RNA promoters are capable of affecting the expression of non-coding RNAs, such as guide RNAs, in plant tissues, and therefore regulating expression of an operably linked sequence encoding the non-coding RNA in plants. Also provided are methods of modifying, producing, and using recombinant DNA molecules which contain the provided small nuclear RNA promoters. Also provided are compositions that include transgenic plant cells, plants, plant parts, and seeds containing the small nuclear RNA promoters of the invention, and methods for preparing and using the same.

In some embodiments, variants of a small nuclear RNA promoter selected from SEQ ID NOs:1-10 are provided. In some embodiments, a variant comprising a sequence that, when optimally aligned to a reference sequence, provided herein as any of SEQ ID NOs:1-10, has at least about 85 percent identity, at least about 86 percent identity, at least about 87 percent identity, at least about 88 percent identity, at least about 89 percent identity, at least about 90 percent identity, at least about 91 percent identity, at least about 92 percent identity, at least about 93 percent identity, at least about 94 percent identity, at least about 95 percent identity, at least about 96 percent identity, at least about 97 percent identity, at least about 98 percent identity, or at least about 99 percent identity to the reference sequence and having promoter activity as disclosed herein are provided. Variants of any of SEQ ID NOs: 1-10 may have the activity of the base activity, for example the promoter activity of the base sequence.

In some embodiments, fragments of a small nuclear RNA promoter selected from SEQ ID NOs:1-10 are provided comprising at least about 50, at least about 75, at least about 95, at least about 100, at least about 125, at least about 150, at least about 175, at least about 200, at least about 225, at least about 250, at least about 275, at least about 300, at least about 325, at least about 350, at least about 375, at least about 400 contiguous nucleotides, at least about 425, at least about 450, at least about 475, or longer, of a DNA molecule having promoter activity as disclosed herein. In certain embodiments, provided are fragments of a small nuclear RNA promoter provided herein, having gene expression activity. Methods for producing such fragments from a starting promoter molecule are well known in the art. Fragments of any of SEQ ID NOs: 1-10 may have the activity of the base activity, for example the promoter activity of the base sequence.

Compositions derived from any of the promoter elements comprised within any of SEQ ID NOs:1-10, such as internal or 5' deletions, for example, can be produced using methods known in the art to improve or alter expression, including by removing elements that have either positive or negative effects on expression; duplicating elements that have positive or negative effects on expression; and/or duplicating or removing elements that have tissue- or cell-specific effects on expression. Compositions derived from any of the promoter elements comprised within any of SEQ ID NOs:1-10 comprised of 3' deletions in which the TATA box element or equivalent sequence thereof and downstream sequence is removed can be used, for example, to make enhancer elements. These enhancer elements can be operably linked to other synthetic or native snRNA promoters to enhance expression. Further deletions can be made to remove any elements that have positive or negative effects on expression. Any of the promoter elements comprised within any of SEQ ID NOs:1-10 and fragments or enhancers derived therefrom can be used to make chimeric transcriptional regulatory element compositions.

In some embodiments, the disclosure provides novel synthetic snRNA (small nuclear RNA) promoters, and methods for their use that include expression of guide RNAs for targeted gene modification of a plant genome by Clustered Regularly Interspersed Short Palindromic Repeats (CRISPR) editing systems. For instance, the disclosure provides, in one embodiment, DNA constructs encoding at least one expression cassette including a synthetic snRNA promoter disclosed herein and a DNA sequence encoding one or more guide RNAs (gRNAs). Methods for causing a CRISPR system to modify a target genome are also provided, as are the genomic complements of a plant modified by the use of such a system. The disclosure thus provides tools and methods that allow one to insert, remove, or modify genes, loci, linkage blocks, and chromosomes within a plant genome.

The disclosure provides, in another embodiment, DNA constructs encoding at least one expression cassette including a promoter disclosed herein and a DNA sequence encoding a nonprotein-coding small RNA (npcRNA). These constructs are useful for expression of npcRNA molecules.

The CRISPR system constitutes an adaptive immune system in prokaryotes that targets endonucleolytic cleavage of the DNA and RNA of invading phage (reviewed in Westra et al., *Annu Rev Genet* 46:311-39, 2012). There are six known types of CRISPR systems which rely on small RNAs for sequence-specific detection and targeting of foreign nucleic acids for destruction: Type I, Type II, Type III, Type V, and Type VI. The components of the bacterial CRISPR systems are CRISPR-associated (Cas) proteins and CRISPR array(s) comprising genome-targeting sequences (protospacers) interspersed with short palindromic repeats. For CRISPR Type II systems, transcription of the protospacer/repeat elements into precursor CRISPR RNA (pre-crRNA) molecules is followed by enzymatic cleavage triggered by hybridization between a trans-acting CRISPR RNA (tracrRNA) molecule and a pre-crRNA palindromic repeat. The resulting crRNA:tracrRNA molecules comprise one copy of the spacer and one scaffold that can complex with a Cas nuclease. The CRISPR/Cas complex is then directed to DNA sequences (protospacer) complementary to the crRNA spacer sequence, where this RNA-Cas protein complex silences the target DNA through enzymatic cleavage of both strands (double-strand break; DSB).

The native bacterial type II CRISPR system requires four molecular components for targeted cleavage of exogenous DNAs: a Cas endonuclease (e.g., Cas9), a house-keeping RNaseIII, CRISPR RNA (crRNA) and trans-acting CRISPR RNA (tracrRNA). The latter two components form a dsRNA complex and bind to Cas9 resulting in an RNA-guided DNA endonuclease complex. For targeted genome modifications in eukaryotes, this system was simplified to two components: the Cas9 endonuclease and a guide-RNA (gRNA). Experiments initially conducted in eukaryotic systems determined that the RNaseIII component was not necessary to achieve targeted DNA cleavage. The minimal two component system of Cas9 with the gRNA, as the only target-specific component, enables this CRISPR system of targeted genome modification to be more cost effective and flexible than other targeting platforms such as meganucleases, Zinc finger nucleases, or TALE-nucleases which require protein engineering for modification at each targeted DNA site. Additionally, the ease of design and production of gRNAs provides the CRISPR system with several advantages for application of targeted genome modification. For example, the CRISPR/Cas system components (Cas endonuclease, gRNA, and, optionally, exogenous DNA for integration into the genome) designed for one or more genomic target sites can be multiplexed in one transformation, or the introduction of the CRISPR/Cas system components can be spatially and/or temporally separated.

As used herein, a "guide nucleic acid" or "guide RNA" or "gRNA" means a nucleic acid that comprises a spacer sequence, which is complementary to (and hybridizes to) a target DNA sequence, and a scaffold sequence, which binds to a Cas protein. In some embodiments, the scaffold sequence and the spacer sequence are covalently linked and expressed as a single RNA transcript or molecule, referred to herein as a "single-chain guide RNA" (or "sgRNA"). In some embodiments, the scaffold sequence and the spacer sequence are expressed as separate transcripts or molecules, referred to herein as a "dual guide RNA" (or "dgRNA"). The spacer sequence may be linked, either covalently or non-covalently, to the 5' end and/or the 3' end of the scaffold sequence. In some embodiments, the guide RNA comprises a CRISPR RNA (crRNA) and a trans-activating crRNA (tracrRNA). In other embodiments, the guide RNA comprises a crRNA but no tracrRNA. In some embodiments, the crRNA comprises both a spacer and scaffold sequence. In some embodiments, the design of the gRNA may be based on a Type I, Type II, Type III, Type IV, Type V, or Type VI CRISPR-Cas system.

In some embodiments, an array of guide RNAs are expressed from a synthetic snRNA promoter as described herein. In some embodiments, a synthetic snRNA promoter as described herein may be operably linked to more than one scaffold-spacer (and/or spacer-scaffold) sequence (e.g., 2, 3, 4, 5, 6, 7, 8, 9, 10, or more scaffold-spacer (and/or spacer-scaffold) sequences) (e.g., scaffold-spacer-scaffold, e.g., spacer-scaffold-spacer, e.g., scaffold-spacer-scaffold-spacer-scaffold-spacer-scaffold-spacer-scaffold-spacer, e.g., spacer-scaffold-spacer-scaffold-spacer-scaffold-spacer-scaffold-spacer-scaffold, and the like). In some embodiments, a guide RNA array comprises one or more tRNAs as described in WO/2016/061481. In some embodiments, the guide RNA array comprises one or more tRNAs separating the scaffold and spacer sequences (e.g., scaffold-spacer-tRNA-scaffold-spacer, e.g., spacer-scaffold-tRNA-spacer-scaffold, e.g., scaffold-spacer-tRNA-scaffold-spacer-tRNA-scaffold-spacer-tRNA-scaffold-spacer-tRNA-scaffold-spacer, e.g., spacer-scaffold-tRNA-spacer-scaffold-tRNA-spacer-scaffold-tRNA-spacer-scaffold-tRNA-spacer-scaffold, and the like). In some embodiments, a scaffold sequence is selected from the group consisting of: a repeat sequence of a Cas12a CRISPR-Cas system or a fragment thereof; a repeat sequence of a Cas12b CRISPR-Cas system or a fragment thereof; a repeat sequence of a Cas12c CRISPR-Cas system or a fragment thereof; a repeat sequence of a Cas12d CRISPR-Cas system or a fragment thereof; a repeat sequence of a Cas12e CRISPR-Cas system or a fragment thereof; a repeat sequence of a Cas9 CRISPR-Cas system or fragment thereof; a repeat sequence of a C2c1 CRISPR Cas system or a fragment thereof; a repeat sequence of a C2c3 CRISPR-Cas system or a fragment thereof; a repeat sequence of a Cas13a CRISPR-Cas system or a fragment thereof; a repeat sequence of a Cas13b CRISPR-Cas system or a fragment thereof; a repeat sequence of a Cas13c CRISPR-Cas system or a fragment thereof; a repeat sequence of a Cas13d CRISPR-Cas system or a fragment thereof; a repeat sequence of a Cas1 CRISPR-Cas system or a fragment thereof; a repeat sequence of a Cas1B CRISPR-Cas system or a fragment thereof; a repeat sequence of a Cas2 CRISPR-Cas system or a fragment thereof; a repeat sequence of a Cas3 CRISPR-Cas system or a fragment thereof; a repeat sequence of a Cas3' CRISPR-Cas system or a fragment thereof; a repeat sequence of a Cas3" CRISPR-Cas system or a fragment thereof; a repeat sequence of a Cas4 CRISPR-Cas system or a fragment thereof; a repeat sequence of a Cas5 CRISPR-Cas system or a fragment thereof; a repeat sequence of a Cas6 CRISPR-Cas system or a fragment thereof; a repeat sequence of a Cas7 CRISPR-Cas system or a fragment thereof; a repeat sequence of a Cas8 CRISPR-Cas system or a fragment thereof; a repeat sequence of a Cas10 CRISPR-Cas system or a fragment thereof; a repeat sequence of a Csy1 CRISPR-Cas system or a fragment thereof; a repeat sequence of a Csy2 CRISPR-Cas system or a fragment thereof; a repeat sequence of a Csy3 CRISPR-Cas system or a fragment thereof; a repeat sequence of a Cse1 CRISPR-Cas system or a fragment thereof; a repeat sequence of a Cse2 CRISPR-Cas system or a fragment thereof; a repeat sequence of a Csc1 CRISPR-Cas system or a fragment thereof; a repeat sequence of a Csc2 CRISPR-Cas system or a fragment thereof; a repeat sequence of a Csa5 CRISPR-Cas system or a fragment thereof; a repeat sequence of a Csn2 CRISPR-Cas system or a fragment thereof; a repeat sequence of a Csm2 CRISPR-Cas system or a fragment thereof; a repeat sequence of a Csm3 CRISPR-Cas system or a fragment thereof; a repeat sequence of a Csm5 CRISPR-Cas system or a fragment thereof; a repeat sequence of a Csm6 CRISPR-Cas system or a fragment thereof; a repeat sequence of a Cmr1 CRISPR-Cas system or a fragment thereof; a repeat sequence of a Cmr3 CRISPR-Cas system or a fragment thereof; a repeat sequence of a Cmr4 CRISPR-Cas system or a fragment thereof; a repeat sequence of a Cmr5 CRISPR-Cas system or a fragment thereof; a repeat sequence of a Cmr6 CRISPR-Cas system or a fragment thereof; a repeat sequence of a Csb1 CRISPR-Cas system or a fragment thereof; a repeat sequence of a Csb2 CRISPR-Cas system or a fragment thereof; a repeat sequence of a Csb3 CRISPR-Cas system or a fragment thereof; a repeat sequence of a Csx10 CRISPR-Cas system or a fragment thereof; a repeat sequence of a Csx14 CRISPR-Cas system or a fragment thereof; a repeat sequence of a Csx15 CRISPR-Cas system or a fragment thereof; a repeat sequence of a Csx16 CRISPR-Cas system or a fragment thereof; a repeat sequence of a Csx17 CRISPR-Cas system or a fragment thereof; a repeat sequence of a CsaX CRISPR-Cas system or a fragment thereof; a repeat sequence of a Csx1 CRISPR-Cas system or a fragment thereof; a repeat sequence of a Csx3 CRISPR-Cas system or a fragment thereof; a repeat sequence of a Csf1 CRISPR-Cas system or a fragment thereof; a repeat sequence of a Csf2 CRISPR-Cas system or a fragment thereof; a repeat sequence of a Csf3 CRISPR-Cas system or a fragment thereof; a repeat sequence of a Csf4 CRISPR-Cas system or a fragment thereof; and a repeat sequence of a Csf5 CRISPR-Cas system or a fragment thereof.

In some embodiments, a guide RNA expressed from a synthetic snRNA promoter as described herein may comprise more than one crRNA sequences (e.g., 2, 3, 4, 5, 6, 7, 8, 9, 10, or more crRNA sequences). In some embodiments, the guide RNA comprises one or more tRNAs separating the crRNA sequences (e.g., crRNA-tRNA-crRNA, e.g., crRNA-tRNA-crRNA-tRNA-crRNA-tRNA-crRNA-tRNA-crRNA, and the like).

In some embodiments, a guide RNA array expressed from a synthetic snRNA promoter as described herein may comprise more than one tracrRNA sequences (e.g., 2, 3, 4, 5, 6, 7, 8, 9, 10, or more tracrRNA sequences). In some embodiments, the guide RNA array comprises one or more tRNAs separating the tracrRNA sequences (e.g., tracrRNA-tRNA-tracrRNA, e.g., tracrRNA-tRNA-tracrRNA-tRNA-tracrRNA-tRNA-tracrRNA-tRNA-tracrRNA, and the like).

In some embodiments, a guide RNA array expressed from a synthetic snRNA promoter as described herein may comprise more than one crRNA-tracrRNA (and/or tracrRNA-crRNA) sequence (e.g., 2, 3, 4, 5, 6, 7, 8, 9, 10, or more crRNA-tracrRNA (and/or tracrRNA-crRNA) sequences) (e.g., crRNA-tracrRNA-crRNA, e.g., tracrRNA-crRNA-tracrRNA, e.g., crRNA-tracrRNA-crRNA-tracrRNA-crRNA-tracrRNA-crRNA-tracrRNA-crRNA-tracrRNA-crRNA-tracrRNA, e.g., tracrRNA-crRNA-tracrRNA-crRNA-tracrRNA-crRNA-tracrRNA-crRNA-tracrRNA, and the like). In some embodiments, the guide RNA array comprises one or more tRNAs separating the crRNA and tracrRNA sequences (e.g., crRNA-tracrRNA-tRNA-crRNA-tracrRNA, e.g., tracrRNA-crRNA-tRNA-tracrRNA-crRNA, e.g., crRNA-tracrRNA-tRNA-crRNA-tracrRNA-tRNA-crRNA-tracrRNA-tRNA-crRNA-tracrRNA-tRNA-crRNA-tracrRNA, e.g., tracrRNA-crRNA-tRNA-tracrRNA-crRNA-tRNA-tracrRNA-crRNA-tRNA-tracrRNA-crRNA-tRNA-tracrRNA-crRNA, and the like).

In some embodiments, a guide RNA expressed from a synthetic snRNA promoter as described herein may further comprise an aptamer sequence (e.g., an MS2 aptamer). In some embodiments, the aptamer sequence recruits a deaminase. In some embodiments, the aptamer sequence recruits a reverse transcriptase. In some embodiments, a guide RNA may comprise one or to two or more aptamers (e.g., 1, 2, 3, 4, 5, 6, 7, 8, 9, 10 or more aptamers).

In some embodiments, a guide RNA expressed from a synthetic snRNA promoter as described herein may further comprise an RNA template for a reverse transcriptase. In some embodiments, a synthetic snRNA promoter as described herein is operably linked to a prime editing guide RNA ("PegRNA").

Cas9 is a class 2 CRISPR effector protein. Class 2 CRISPR-Cas systems rely on a single-component effector protein such as Cas9, in which a single gRNA-bound Cas protein recognizes and cleaves the target sequences. Cas9 recognizes a G-rich protospacer-adjacent motif (PAM) that is 3' to its guide RNA binding site. In some embodiments, a CRISPR Cas9 protein can be a Cas9 protein from, for example, *Streptococcus* spp. (e.g., *S. pyogenes, S. thermophilus*), *Lactobacillus* spp., *Bifidobacterium* spp., *Kandleria* spp., *Leuconostoc* spp., *Oenococcus* spp., *Pediococcus* spp., *Weissella* spp., and/or *Olsenella* spp. Additional families of class 2 Cas effector proteins have been discovered: Cpf1 (also known as Cas12a), C2c1, CasX, and CasY (Burstein et al., *Nature*, 542:237-241, 2017).

Cas12a belongs to the class 2, Type V CRISPR system and utilizes a single RNA-guided endonuclease lacking tracrRNA. Cas12a systems recognize a T-rich protospacer-adjacent motif (PAM). The T-rich PAM allows for applications in genome editing in organisms with particularly AT-rich genomes or areas of interest with AT enrichment. The CRISPR array is processed into short mature crRNAs of 42-44 nucleotides in length. Each mature crRNA begins with 19 nucleotides of the direct repeat scaffold followed by 23-25 nucleotides of the spacer sequence. This crRNA arrangement contrasts with that of type II CRISPR-Cas systems in which the mature crRNA starts with 20-24 nucleotides of spacer sequence followed by approximately 22 nucleotides of direct repeat scaffold (Zetsche et al., *Cell* 163:759-771, 2015). Cas12a generates staggered cuts when cleaving a double-stranded DNA molecule which is in contrast to a blunt-end cut (such as those generated by Cas9). An example of a Cas12a coding sequences comprising transit peptides for delivery to the nucleus of the cell is presented as SEQ ID NO:12 and encodes the protein presented as SEQ ID NO:19.

A CRISPR-Cas nuclease useful with this invention can include, but is not limited, to Cas9, C2c1, C2c3, Cas12a (also referred to as Cpf1), Cas12b, Cas12c, Cas12d, Cas12e, Cas13a, Cas13b, Cas13c, Cas13d, Cas1, Cas1B, Cas2, Cas3, Cas3', Cas3", Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4 (dinG), Csf5 and/or Mad7 nuclease. In some embodiments, the CRISPR-Cas nuclease may be a Cas9, Cas12a (Cpf1), Cas12b, Cas12c (C2c3), Cas12d (CasY), Cas12e (CasX), Cas12g, Cas12h, Cas12i, C2c4, C2c5, C2c8, C2c9, C2c10, Cas14a, Cas14b, and/or Cas14c effector protein. In some embodiments, a CRISPR-Cas nuclease useful with the invention may comprise a mutation in its nuclease active site (e.g., RuvC, HNH, e.g., RuvC site of a Cas12a nuclease domain; e.g., RuvC site and/or HNH site of a Cas9 nuclease domain). A CRISPR-Cas nuclease having a mutation in its nuclease active site, and therefore, no longer comprising nuclease activity, is commonly referred to as "dead," e.g., dCas such as dCas9 or dCas12a. In some embodiments, a CRISPR-Cas nuclease domain or polypeptide having a mutation in its nuclease active site may have impaired activity or reduced activity as compared to the same CRISPR-Cas nuclease without the mutation, e.g., a nickase, e.g, Cas9 nickase, Cas12a nickase. Recently, CRISPR associated transposases (CAST) have been discovered and characterized. CASTs are comprised of Tn7-like transposase subunits, tnsB, tnsC, and tniQ, and the Type V-K CRISPR effector, Cas12k, catalyzes site-directed DNA transposition. Cas12k forms a complex with partially complementary non-coding RNA species, crRNA and tracrRNA and the tripartite ribonucleo-protein (RNP) complex recognizes chromosomal sites for transposition based on the presence of a protospacer adjacent motif (PAM) and complementarity between the variable portion of crRNA and the target DNA. The associated transposases, tnsB, tnsC and tniQ recognize the transposon by the conserved 'left end' (LE) and 'right end' (RE) boundaries and they insert it into a chromosomal site near the target sequence recognized by Cas12k, preferentially between a TA dinucleotide. Two homologous CAST systems, native in the cyanobacteria species *Scytonema hofmanni* (UTEX B 2349) and *Anabaena cylindrica* (PCC 7122) have been demonstrated to be functional for transposition in *E. coli* (Strecker et al., *Science* 365 (6448):48-53, 2019).

Expression Strategies for gRNAs

The disclosure provides, in certain embodiments, novel combinations of synthetic snRNA promoters (and functional fragments thereof) and a DNA sequence encoding one or more guide nucleic acid molecules. Guide nucleic acid molecules provided herein can be DNA, RNA, or a combination of DNA and RNA.

In one embodiment, a synthetic snRNA promoter is operably linked to one or more gRNA-encoding sequences, in order to constitutively express the gRNA(s) in transformed cells. This may be desirable, for example in some embodiments, when the resulting gRNA transcripts are retained in the nucleus and will thus be optimally located within the cell to guide nuclear processes. This may also be desirable, for example in some embodiments, when the activity of the CRISPR system is low or the frequency of finding and cleaving the target site is low. It may also be desirable in some embodiments when a promoter for a specific cell type, such as the germ line, is not known for a given species of interest.

In another embodiment, a fragment of the synthetic snRNA promoter comprising the necessary cis elements to drive transcription can be used to express one or more gRNAs. The disclosed full length synthetic snRNA promoters, presented as SEQ ID NOs:1-5 are each around 500 bp in length. Constructs comprising multiple synthetic snRNA promoters may become large as additional expression cassettes are cloned in tandem. This may result in issues affecting stability and transformation. Therefore, in certain instances the synthetic snRNA promoters may be truncated to reduce the size of the construct, so long as the truncated synthetic snRNA promoter retains the ability to drive transcription of the gRNA. Examples of such truncated synthetic snRNA promoters are presented as SEQ ID NOs:6-10.

Multiple synthetic snRNA promoters (or functional fragments thereof) with differing sequences may be utilized to minimize problems in construct stability, which is typically associated with sequence repeats and may be utilized to facilitate stacking of multiple gRNA cassettes in the same transformation construct.

In some embodiments, a synthetic snRNA promoter (or functional fragments thereof) as described herein may drive the expression of a single gRNA. In some embodiments, a synthetic snRNA promoter (or functional fragments thereof) as described herein may drive the expression of arrays of 2, 3, 4, 5, 6, 7, 8, 9, 10, 11, 12, 13, 14, 15, 16, 17, 18, 19, 20, 21, 22, 23, 24, 25, 26, 27, 28, 29, 30 or more gRNAs. Each individual guide sequence may target the same target sequence or a different target sequences. This configuration is suitable for multiplex genetic manipulation (eg: targeting multiple genes). Several strategies have been described in the art to facilitate the processing of individual guide RNAs from a single transcript. In some embodiments, a synthetic snRNA promoter (or functional fragments thereof) as described herein may be used to drive gRNA arrays where the expression cassette comprises at least two or more gRNAs separated by one or more tRNA cleavage sequence (US20190330647). A tRNA cleavage sequence includes any sequence and/or structural motif that actively interacts with and is cleaved by a cell's endogenous tRNA system such as RNase P, RNase Z and RNase E (bacteria). This can include structural recognition elements such as the acceptor stem, D-loop arm, T Psi C loop as well as specific sequence motifs. In another embodiment, a synthetic snRNA promoter (or functional fragments thereof) as described herein may be used to drive gRNA arrays comprising two or more gRNAs separated by one or more ribozyme cleavage sites (Tang et al., Mol. Plant 9:1088-1091, 2016). In another embodiment, a synthetic snRNA promoter (or functional fragments thereof) as described herein may be used to drive gRNA arrays comprising two or more gRNAs arrays separated by one or more Csy4 ribonuclease recognition sites (Tsai et al., Nat. Biotechnol, 32(6): 569-576, 2014).

In some embodiments, a synthetic snRNA promoter (or functional fragments thereof) as described herein may be used to drive the expression of a prime editing gRNA (PEgRNA). Prime editing is a genome editing method that directly writes new genetic information into a targeted DNA site using a nucleic acid programmable DNA binding protein (napDNAbp) (eg:Cas9) working in association with a polymerase (e.g., in the form of a fusion protein or otherwise provided in trans with the napDNAbp), wherein the prime editing system is programmed with a specialized prime editing (PE) guide RNA ("PEgRNA") that both specifies the target site and templates the synthesis of the desired edit in the form of a replacement DNA strand by way of an extension (either DNA or RNA) engineered onto a guide RNA (e.g., at the 5' or 3' end, or at an internal portion of a guide RNA) (WO2020191248). In some embodiments, a synthetic snRNA promoter (or functional fragments thereof) as described herein is used to drive expression of a PEgRNA that comprises a guide RNA and at least one nucleic acid extension arm comprising a DNA synthesis template wherein the nucleic acid extension arm is positioned at the 3' or 5' end of the guide RNA.

In another embodiment, a synthetic snRNA promoter (or functional fragments thereof) as described herein may be used to drive the expression of an augmented gRNA that further comprises an RNA mobility sequence that enables cell to cell movement of the RNA. The RNA mobility sequence may be a sequence derived from plant genes like the Flowering Time (FT) gene, BELS, GAI, tRNA-like motif, or LeT6 (WO2021041001).

In other embodiments, a synthetic snRNA promoter (or functional fragments thereof) as described herein may be used to drive expression of CRISPR RNA (crRNA), a mature crRNA, a precursor crRNA, a crRNA fragment, a trans-activating crRNA (tracrRNA) or a tracrRNA fragment.

In some embodiments, a synthetic snRNA promoter (or functional fragments thereof) as described herein may be used to drive gRNAs that are compatible with other forms of CRISPR-mediated gene editing, such as base editing (Komor et al., Nature 533, 420-424, 2016; Gaudelli et. al., Nature 551:464-471, 2017; Komor et. al., Science Advances Vol 3: No. 8, 2017; and Rees et. al., Nat Rev Genet. 19(12):770-788, 2018).

In some embodiments, a synthetic snRNA promoter (or functional fragments thereof) as described herein may be used to drive gRNAs that are compatible with the CRISPR Associated Transposase systems (CAST) such as those derived from *Scytonema hofmanni* (ShCAST) and *Anabaena cylindrica* (AcCAST) (Strecker et al., Science 365 (6448):48-53, 2019).

In some embodiments, a synthetic snRNA promoter (or functional fragments thereof) as described herein may be used to drive expression of one or more non-protein-coding RNAs (npcRNAs). Non-limiting examples of non-protein-coding RNAs include microRNAs (miRNAs), miRNA precursors, small interfering RNAs (siRNAs), small RNAs (22-26 nt in length) and precursors encoding same, heterochromatic siRNAs (hc-siRNAs), Piwi-interacting RNAs (piRNAs), hairpin double stranded RNAs (hairpin dsRNAs), trans-acting siRNAs (ta-siRNAs), naturally occurring antisense siRNAs (nat-siRNAs) and tRNAs.

Expression Strategies for CRISPR Class 2, Type II or Type V-Associated Genes

The disclosure provides novel synthetic snRNA promoters (and functional fragments thereof) for use in sequence-specific CRISPR-mediated cleavage for molecular breeding by providing transcription of, for example, a gRNA comprising a spacer sequence used to target a site for endonuclease cleavage by at least one Cas protein. In certain embodiments, the target site is a genomic target site. In some embodiments, the genomic target site is native or transgenic. In addition, CRISPR systems can be customized to catalyze cleavage at one or more genomic target sites.

One aspect of this disclosure is to introduce into a plant cell an expression construct comprising one or more cassettes encoding a synthetic snRNA promoter (or a functional fragment thereof) as described herein, operably linked to a nucleotide sequence encoding one or more gRNAs, including a copy of a spacer sequence complementary to a target site (e.g., a genomic target site), and an expression construct encoding a Type I, Type II, Type III, Type IV, Type V, or Type VI CRISPR associated protein to modify the plant cell in such a way that the plant cell, or a plant comprised of such cells, will subsequently exhibit a beneficial trait. In one non-limiting example, the trait is a trait such as improved yield, resistance to biotic or abiotic stress, herbicide tolerance, or other improvements in agronomic performance. The ability to generate such a plant cell derived therefrom depends on introducing the CRISPR system using transformation constructs and cassettes described herein.

The expression construct encoding a CRISPR associated protein may comprise a promoter. In certain embodiments, the promoter is a constitutive promoter, a tissue specific promoter, a developmentally regulated promoter, or a cell cycle regulated promoter. Certain contemplated promoters include ones that only express in the germline or reproductive cells, among others. Such developmentally regulated promoters have the advantage of limiting the activity of the CRISPR system to only those cells in which the CRISPR associated protein is expressed. In some embodiments, a CRISPR-mediated genetic modification (e.g., chromosomal or episomal dsDNA cleavage) is limited only to cells that are involved in transmitting their genome from one generation to the next. This might be useful if broader expression of the CRISPR system were genotoxic or had other unwanted effects. Examples of such promoters include the promoters of genes encoding DNA ligases, recombinases, replicases, and so on.

In some embodiments, a DNA construct as described herein contains one or more synthetic snRNA promoters, or fragments thereof, that express high levels of a DNA sequence encoding a one or more gRNAs. A DNA construct that expresses a gRNA that guides a CRISPR class 2, type II or type V-associated protein with endonuclease activity to a specific genomic sequence, such that the specific genomic sequence is cleaved and produces a double-stranded break which is repaired by a double strand break repair pathway, which may include, for example, non-homologous end-joining, microhomology mediated end joining (MMEJ) homologous recombination, synthesis-dependent strand annealing (SDSA), single-strand annealing (SSA), or a combination thereof thereby disrupting the native locus, may be particularly useful.

In one embodiment, a CRISPR system comprises at least one Type I, Type II, Type III, Type IV, Type V, or Type VI CRISPR-associated protein and one gRNA comprising a copy of a spacer sequence complementary to an endogenous target site.

In some embodiments, the CRISPR system can include catalytically inactive CRISPR endonucleases. Such an endonuclease would comprise a domain that retains the ability to bind its target nucleic acid but has a diminished, or eliminated, ability to cleave a nucleic acid molecule, as compared to a control nuclease. In some embodiments, the catalytically inactive nuclease is a catalytically inactive Cas9. In some embodiments, the catalytically inactive Cas9 produces a nick in one of the target DNA strands. In some embodiments, the catalytically inactive Cas9, known as dead Cas9 (dCas9), lacks all nuclease activity. In some embodiments, the catalytically inactive nuclease is a catalytically inactive Cas12a. In some embodiments, the catalytically inactive Cas12a produces a nick in one of the target DNA strands. In some embodiments, the catalytically inactive Cas12a, known as dead Cas12a (dCas12a), lacks all DNase activity.

The present disclosure also provides for use of CRISPR-mediated double-stranded DNA cleavage to genetically alter expression and/or activity of a gene or gene product of interest in a tissue- or cell-type specific manner to improve productivity or provide another beneficial trait, wherein the nucleic acid of interest may be endogenous or transgenic in nature. Thus, in one embodiment, a CRISPR system is engineered to mediate disruption at specific sites in a gene of interest. Genes of interest include those for which altered expression level/protein activity is desired. These DNA cleavage events can be either in coding sequences or in regulatory elements within the gene.

This disclosure provides for the introduction of components of a CRISPR system (e.g., a CRISPR-associated protein and its cognate gRNA) into a cell. Examples of CRISPR-associated proteins include natural and engineered (e.g., modified, including codon-redesigned) nucleotide sequences encoding polypeptides with nuclease activity such as Cas9 from *Streptococcus pyogenes, Streptococcus thermophilus*, or *Bradyrhizobium* sp.; Cpf1 (also known as Cas12a) from *Francisella novicida* (FnCpf1), *Prevotella* sp., Acidaminococcus sp. BV3L6, and Lachnospiraceae bacterium ND2006 (LbCpf1); C2c1 from *Alicyclobacillus acidoterrestris Bacilli* sp., *Verrucomicrobia* sp., α-proteobacteria, or δ-proteobacteria; CasX from Planctomycetes and δ-proteobacteria; or CasY from *Candidatus Kerfeldbacteria, Candidatus Vogelbacteria, Candidatus Parcubacteria*, or *Candidatus Komeilibacteria*.

In particular embodiments, the codon-redesigned FnCpf1 and LbCpf1 nucleotide sequences and expression cassettes include recombinant nucleic acid sequences disclosed in U.S. 2020/0080096, the contents and disclosures of which are incorporated herein by reference.

The catalytically active CRISPR-associated gene (e.g., Cas9 endonuclease, C2c1 endonuclease, CasX endonuclease, CasY endonuclease, or Cpf1 endonuclease) can be introduced into, or produced by, a target cell. Various methods may be used to carry this out, as disclosed herein.

Transient Expression of CRISPRs

In some embodiments, one or more expression cassettes encoding the gRNA and/or CRISPR associated protein components of a Type I, Type II, Type III, Type IV, Type V, or Type VI CRISPR-Cas system is transiently introduced into a cell. In certain embodiments, the introduced one or more expression cassettes encoding the gRNA and/or CRISPR associated protein is provided in sufficient quantity to modify the cell but does not persist after a contemplated period of time has passed or after one or more cell divisions. In such embodiments, no further steps are needed to remove or segregate the one or more expression cassettes encoding the gRNA and/or CRISPR associated protein from the modified cell. In yet other embodiments of this disclosure, double-stranded DNA fragments are also transiently introduced into a cell along with one or more expression cassettes encoding the gRNA and/or CRISPR associated protein. In such embodiments, the introduced double-stranded DNA fragments are provided in sufficient quantity to modify the cell but do not persist after a contemplated period of time has passed or after one or more cell divisions.

In another embodiment, mRNA encoding the CRISPR associated protein is introduced into a cell. In such embodiments, the mRNA is translated to produce the CRISPR associated protein in sufficient quantity to modify the cell (in the presence of at least one gRNA whose expression is driven by a synthetic snRNA promoter (or functional fragments thereof) as described herein) but does not persist after a contemplated period of time has passed or after one or more cell divisions. In such embodiments, no further steps are needed to remove or segregate the CRISPR associated protein from the modified cell.

In one embodiment of this disclosure, a catalytically active CRISPR associated protein is prepared in vitro prior to introduction to a plant cell comprising at least one gRNA whose expression is driven by a synthetic snRNA promoter (or functional fragment thereof) as described herein. The method of preparing a CRISPR associated protein depends on its type and properties and would be known by one of skill in the art. For example, if the CRISPR associated protein is a large and monomeric, the active form of the CRISPR associated protein can be produced via bacterial expression, in vitro translation, via yeast cells, in insect cells, or by other protein production techniques known in the art. After expression, the CRISPR associated protein is isolated, refolded if needed, purified and optionally treated to remove any purification tags, such as a His-tag. Once crude, partially purified, or more completely purified CRISPR associated proteins are obtained, the protein may be introduced to, for example, a plant cell via electroporation, by bombardment with CRISPR associated protein coated particles, by chemical transfection or by some other means of transport across a cell membrane. Methods for introducing proteins and nucleic acids into plant cells are well known in the art. The protein can also be delivered using nanoparticles, which can deliver a combination of active protein and nucleic acid. Once a sufficient quantity of the CRISPR-associated protein is introduced so that an effective amount of in vivo activity is present, along with the appropriate gRNA, the target sequences within the genome are cleaved. It is also recognized that one skilled in the art might create a CRISPR associated protein that is inactive but is activated in vivo by native processing machinery; such a CRISPR associated protein is also contemplated by this disclosure.

In another embodiment, a construct that will transiently express a gRNA and/or CRISPR associated protein is created and introduced into a plant cell. In yet another embodiment, the construct will produce sufficient quantities of the gRNAs and/or CRISPR associated protein in order for the desired episomal or genomic target site or sites to be effectively modified. For instance, the disclosure contemplates preparation of a construct that can be bombarded, electroporated, chemically transfected or transported by some other means into a plant cell. Such a construct could have several useful properties. For instance, in one embodiment, the construct can replicate in a bacterial host such that the construct can be produced and purified in sufficient quantities for transient expression. In another embodiment, the construct can encode a herbicide resistance gene to allow selection for the construct in a host, or the construct can also comprise an expression cassette to provide for the expression of the gRNA and/or CRISPR associated protein in a plant. In a further embodiment, the CRISPR associated protein expression cassette could contain a promoter region, a 5' untranslated region, an optional intron to aid expression, a multiple cloning site to allow facile introduction of a DNA sequence encoding the CRISPR associated protein, and a 3' UTR. In particular embodiments, the promoter of the CRISPR associated protein expression cassette could be a constitutive promoter, tissue specific promoter, or other type of promoter that expresses in a plant cell. In a further embodiment, the gRNA expression cassette could contain a snRNA promoter (or functional fragment thereof) as described herein, a gRNA encoding sequence, and a short poly-T region that terminates transcription. In some embodiments, the promoters in the gRNA expression cassettes would be synthetic snRNA promoters selected from SEQ ID NOs:1-5. In some embodiments, the promoters in the gRNA expression cassettes would be synthetic snRNA promoters selected from SEQ ID NOs:6-10. In some embodiments, it can be beneficial to include unique restriction sites at one or at each end of the expression cassette to allow the production and isolation of a linear expression cassette, which can then be free of other construct elements. The untranslated leader regions, in certain embodiments, can be plant-derived untranslated regions. Use of an intron, which can be plant-derived, is contemplated when the expression cassette is being transformed or transfected into a monocot or dicot cell.

In other embodiments, one or more elements in the construct include a spacer complementary to a target site contained within an episomal or genomic sequence. This facilitates CRISPR-mediated modification within the expression cassette, enabling removal and/or insertion of elements such as promoters and transgenes.

In another approach, a transient expression construct may be introduced into a plant cell using a bacterial or viral construct host. For example, *Agrobacterium* is one such bacterial construct that can be used to introduce a transient expression construct into a host plant cell. When using a bacterial, viral or other construct host system, the transient expression construct is contained within the host construct system. For example, if the *Agrobacterium* host system is used, the transient expression cassette would be flanked by one or more T-DNA borders and cloned into a binary construct. Many such construct systems have been identified in the art (reviewed in Hellens et al., 2000).

In embodiments, whereby one or more of the gRNA and/or CRISPR associated protein components of a CRISPR system is transiently introduced in sufficient quantities to modify a plant cell, a method of selecting the modified plant cell may be employed. In one such method, a second nucleic acid molecule containing a selectable marker is co-introduced with the transient gRNA and/or CRISPR associated protein. In this embodiment, the co-introduced marker may be part of a molecular strategy to introduce the marker at a target site. For example, the co-introduced marker may be used to disrupt a target gene by inserting between genomic target sites. In another embodiment, the co-introduced nucleic acid may be used to produce a visual marker protein such that transfected cells can be cell-sorted or isolated by some other means. In yet another embodiment, the co-introduced marker may randomly integrate or be directed via a second gRNA: CRISPR associated protein complex to integrate at a site independent of the primary genomic target site. In still yet another embodiment, the co-introduced molecule may be targeted to a specific locus via a double strand break repair pathway, which may include, for example, non-homologous end-joining (NHEJ), microhomology mediated end joining (MMEJ), homologous recombination, synthesis-dependent strand annealing (SDSA), single-strand annealing (SSA), or a combination thereof, at the genomic target site(s). In the above embodiments, the co-introduced marker may be used to identify or select for cells that have likely been exposed to the gRNA and/or CRISPR associated protein and therefore are likely to have been modified by the CRISPR.

Stable Expression of CRISPRs

In another embodiment, one or more expression constructs encoding one or more components of a CRISPR system (e.g., a CRISPR associated protein and its cognate gRNA) are stably transformed into a plant cell. In this embodiment, the design of the transformation construct provides flexibility for when and under what conditions the gRNA and/or CRISPR associated protein is expressed. Furthermore, the transformation construct can be designed to comprise a selectable or visible marker that will provide a means to isolate or efficiently select cell lines that contain one or more expression constructs encoding one or more components of a CRISPR system and/or have been modified by the CRISPR system.

Cell transformation systems have been described in the art and descriptions include a variety of transformation constructs. For example, for plant transformations, two principal methods include *Agrobacterium*-mediated transformation and particle gun bombardment-mediated (e.g., biolistic) transformation. In both cases, the nucleotide sequences encoding the CRISPR system components are introduced via one or more expression cassettes. In a further embodiment, a CRISPR associated protein expression cassette could contain a promoter region, a 5' untranslated region, an optional intron to aid expression, a multiple cloning site to allow facile introduction of a DNA sequence encoding a CRISPR associated protein, and a 3' UTR. In particular embodiments, the promoter of the CRISPR associated protein expression cassette could be a constitutive promoter, a tissue specific promoter, a developmentally regulated promoter, a cell cycle regulated promoter, or a germline specific promoter. In a further embodiment, the gRNA expression cassette could contain a snRNA promoter (or functional fragment thereof) as described herein, a gRNA encoding sequence, and a short poly-T region that terminates transcription. In particular embodiments, the promoter in a gRNA expression cassette would be synthetic snRNA promoter selected from SEQ ID NOs:1-5. In some embodiments, the promoter in a gRNA expression cassette would be a synthetic snRNA promoter selected from SEQ ID NOs:6-10.

For particle bombardment or with protoplast transformation, the expression cassette can be an isolated linear fragment or may be part of a larger construct that might contain bacterial replication elements, bacterial selectable markers or other elements. The one or more gRNA and/or CRISPR associated protein expression cassette(s) may be physically linked to a marker cassette or may be mixed with a second nucleic acid molecule encoding a marker cassette. In some embodiments, a marker cassette is comprised of necessary elements to express a visual or selectable marker that allows for efficient selection of transformed cells. In the case of *Agrobacterium*-mediated transformation, the one or more expression cassettes may be adjacent to or between flanking T-DNA borders and contained within a binary construct. In another embodiment, the one or more expression cassettes may be outside of the T-DNA. The presence of the one or more expression cassettes in a cell may be manipulated by positive or negative selection regime(s). Furthermore, a selectable marker cassette may also be within or adjacent to the same T-DNA borders or may be somewhere else within a second T-DNA on the binary construct (e.g., a 2 T-DNA system).

In some embodiments, cells that have been modified by a CRISPR system, either transiently or stably, are carried forward along with unmodified cells. The cells can be sub-divided into independent clonally derived lines or can be used to regenerate independently derived plants. Individual plants or clonal populations regenerated from such cells can be used to generate independently derived lines. At any of these stages a molecular assay can be employed to screen for cells, plants or lines that have been modified. Cells, plants or lines that have been modified continue to be propagated and unmodified cells, plants or lines are discarded. In some embodiments, the presence of an active CRISPR system in a cell is essential to ensure the efficiency of the overall process.

Transformation Methods

Methods for transforming or transfecting a cell are well known in the art. Methods for plant transformation using *Agrobacterium* or DNA coated particles are well known in the art and are incorporated herein. Suitable methods for transformation of host cells for use with the current disclosure are believed to include virtually any method by which DNA can be introduced into a cell, for example by *Agrobacterium*-mediated transformation (U.S. Pat. Nos. 5,563,055; 5,591,616; 5,693,512; 5,824,877; 5,981,840; and 6,384,301) and by acceleration of DNA coated particles (U.S. Pat. Nos. 5,015,580; 5,550,318; 5,538,880; 6,160,208; 6,399,861; and 6,403,865), etc. Through the application of techniques such as these, the cells of virtually any species may be stably transformed.

Various methods for selecting transformed cells have been described. For example, one might utilize a drug resistance marker such as a neomycin phosphotransferase protein to confer resistance to kanamycin or to use 5-enolpyruvyl shikimate phosphate synthase to confer tolerance to glyphosate. In another embodiment, a carotenoid synthase is used to create an orange pigment that can be visually identified. These three exemplary approaches can each be used effectively to isolate a cell or plant or tissue thereof that has been transformed and/or modified by a CRISPR.

When a nucleic acid sequence encoding a selectable or screenable marker is inserted into a genomic target site, the marker can be used to detect the presence or absence of a CRISPR or its activity. This may be useful once a cell has been modified by a CRISPR, and recovery of a genetically modified cell that no longer contains the CRISPR, or a regenerated plant from such a modified cell, is desired. In other embodiments, the marker may be intentionally designed to integrate at the genomic target site, such that it can be used to follow a modified cell independently of the CRISPR. The marker can be a gene that provides a visually detectable phenotype, such as in the seed, to allow rapid identification of seeds that carry or lack a CRISPR expression cassette.

This disclosure provides for a means to regenerate a plant from a cell with a repaired double-stranded break within a genomic target site. The regenerate can then be used to propagate additional plants.

The disclosure additionally provides novel plant transformation constructs and expression cassettes which include synthetic snRNA promoters, and combinations thereof, with CRISPR-associated gene(s) and gRNA/expression cassettes. The disclosure further provides methods of obtaining a plant cell, a whole plant, and a seed or embryo that have been specifically modified using CRISPR-mediated cleavage. This disclosure also relates to a novel plant cell containing a CRISPR-associated Cas endonuclease expression construct and gRNA expression cassettes.

Targeting Using Blunt-End Oligonucleotides

In certain embodiments, a CRISPR system (e.g., a CRISPR/Cas9 system or CRISPR/Cas12a system) can be utilized for targeting 5' insertion of a blunt-end double-stranded DNA fragment into a genomic target site of interest. In some embodiments, CRISPR-mediated endonuclease activity can introduce a double stand break (DSB) in the selected genomic target site and DNA repair, such as microhomology-driven non-homologous end-joining DNA repair, results in insertion of the blunt-end double-stranded DNA fragment into the DSB. In some embodiments, blunt-end double-stranded DNA fragments can be designed with 1-10 bp of microhomology, on both the 5' and 3' ends of the DNA fragment, that correspond to the 5' and 3' flanking sequence at the cut site in the genomic target site.

Use of CRISPR Systems in Molecular Breeding

In some embodiments, genome knowledge is utilized for targeted genetic alteration of a genome. At least one gRNA can be designed to target at least one region of a genome to disrupt that region from the genome. This aspect of the disclosure may be especially useful for genetic alterations. The resulting plant could have a modified phenotype or other property depending on the gene or genes that have been altered. Previously characterized mutant alleles or introduced transgenes can be targeted for CRISPR-mediated modification, enabling creation of improved mutants or transgenic lines.

In another embodiment, a gene targeted for deletion or disruption may be a transgene that was previously introduced into the target plant or plant cell. This has the advantage of allowing an improved version of a transgene to be introduced or by allowing disruption of a selectable marker encoding sequence. In yet another embodiment, a gene targeted for disruption via a CRISPR system is at least one transgene that was introduced on the same construct or expression cassette as (an)other transgene(s) of interest, and resides at the same locus as another transgene. It is understood by those skilled in the art that this type of CRISPR-mediated modification may result in deletion or insertion of additional sequences. Thus it may, in certain embodiments, be preferable to generate a plurality of plants or plant cells in which a deletion has occurred, and to screen such plants or plant cells using standard techniques to identify specific plants or plant cells that have minimal alterations in their genomes following CRISPR-mediated modification. Such screens may utilize genotypic and/or phenotypic information. In such embodiments, a specific transgene may be disrupted while leaving the remaining transgene(s) intact. This avoids having to create a new transgenic line containing the desired transgenes without the undesired transgene.

In another aspect, the present disclosure includes methods for inserting a DNA fragment of interest into a specific site of a plant's genome, wherein the DNA fragment of interest is from the genome of the plant or is heterologous with respect to the plant. This disclosure allows one to select or target a particular region of the genome for nucleic acid (e.g., transgene) stacking (e.g., mega-locus). A targeted region of the genome may thus display linkage of at least one transgene to a haplotype of interest associated with at least one phenotypic trait, and may also result in the development of a linkage block to facilitate transgene stacking and transgenic trait integration, and/or development of a linkage block while also allowing for conventional trait integration.

Use of CRISPR Systems in Trait Integration

Directed insertion, in at least one genomic target site, of DNA fragments of interest, via CRISPR-mediated cleavage allows for targeted integration of multiple nucleic acids of interest (e.g., a trait stack) to be added to the genome of a plant in either the same site or different sites. Sites for targeted integration can be selected based on knowledge of the underlying breeding value, transgene performance in that location, underlying recombination rate in that location, existing transgenes in that linkage block, or other factors. Once the stacked plant is assembled, it can be used as a trait donor for crosses to germplasm being advanced in a breeding pipeline or be directly advanced in the breeding pipeline.

The present disclosure includes methods for inserting at least one nucleic acid of interest into at least one site, wherein the nucleic acid of interest is from the genome of a plant, such as a QTL or allele, or is transgenic in origin. A targeted region of the genome may thus display linkage of at least one transgene to a haplotype of interest associated with at least one phenotypic trait (as described in U.S. Patent Application Publication No. 2006/0282911), development of a linkage block to facilitate transgene stacking and transgenic trait integration, development of a linkage block to facilitate QTL or haplotype stacking and conventional trait integration, and so on.

In another embodiment of this disclosure, multiple unique gRNAs can be used to modify multiple loci within one linkage block contained on one chromosome by making use of knowledge of genomic sequence information and the ability to design custom gRNAs as described in the art. A gRNA that is specific for, or can be directed to, a genomic target site that is upstream of the locus containing the non-target allele is designed or engineered as necessary. A second gRNA that is specific for, or can be directed to, a genomic target site that is downstream of the target locus containing the non-target allele is also designed or engineered. The gRNAs may be designed such that they complement genomic regions where there is no homology to the non-target locus containing the target allele. Both gRNAs may be introduced into a cell using one of the methods described above.

The ability to execute targeted integration relies on the action of the gRNA:CRISPR associated protein. This advantage provides methods for engineering plants of interest, including a plant or cell, comprising at least one genomic modification.

A custom gRNA can be utilized in a CRISPR system to generate at least one trait donor to create a custom genomic modification event that is then crossed into at least one second plant of interest, including a plant, wherein CRISPR associated protein delivery can be coupled with the gRNA of interest to be used for genome editing. In other aspects one or more plants of interest are directly transformed with the CRISPR system and at least one double-stranded DNA fragment of interest for directed insertion. It is recognized that this method may be executed in various cell, tissue, and developmental types, including gametes of plants. It is further anticipated that one or more of the elements described herein may be combined with use of promoters specific to particular cells, tissues, plant parts and/or developmental stages, such as a meiosis-specific promoter.

In addition, the disclosure contemplates the targeting of a transgenic element already existing within a genome for deletion or disruption. This allows, for instance, an improved version of a transgene to be introduced, or allows selectable marker removal. In yet another embodiment, a gene targeted for disruption via CRISPR-mediated cleavage is at least one transgene that was introduced on the same construct or expression cassette as (an)other transgene(s) of interest and resides at the same locus as another transgene.

In one aspect, the disclosure provides a method for modifying a locus of interest in a cell comprising (a) identifying at least one locus of interest within a DNA sequence; (b) introducing into the cell an expression cassette comprising a synthetic snRNA promoter selected from SEQ ID NOs:1-10 operably linked to a nucleotide sequence encoding a gRNA and an expression cassette comprising a plant expressible promoter operably linked to a nucleic acid sequence encoding a CRISPR associated protein, wherein the gRNA and/or CRISPR associated protein is expressed transiently or stably; (d) assaying the cell for a CRISPR-mediated modification in the DNA making up or flanking the locus of interest; and (e) identifying the cell or a progeny cell thereof as comprising a modification in said locus of interest.

Another aspect provides a method for modifying multiple loci of interest in a cell comprising (a) identifying multiple loci of interest within a genome; (b) introducing into at least one cell multiple expression cassettes comprising a synthetic snRNA promoter selected from SEQ ID NOs:1-10 operably linked to a nucleotide sequence encoding a gRNA, wherein the synthetic snRNA promoters are selected independently, and at least one expression cassette comprising a plant expressible promoter operably linked to a nucleic acid sequence encoding a CRISPR associated protein according to the disclosure, wherein the cell comprises the genomic target sites and the gRNAs and CRISPR associated protein are expressed transiently or stably and creates a modified locus, or loci, that includes at least one CRISPR-mediated cleavage event; (d) assaying the cell for CRISPR-mediated modifications in the DNA making up or flanking each locus of interest; and (e) identifying a cell or a progeny cell thereof which comprises a modified nucleotide sequence at said loci of interest.

The disclosure further contemplates sequential modification of a locus of interest, by two or more gRNAs and CRISPR associated protein(s) according to the disclosure. Genes or other sequences added by the action of such a first CRISPR-mediated genomic modification may be retained, further modified, or removed by the action of a second CRISPR-mediated genomic modification.

The present invention thus includes compositions and methods for modifying a locus of interest in a crop plant such as maize (corn: *Zea mays* subsp. *mays*); corn varieties (flour corn (*Zea mays* var. *amylacea*), popcorn (*Zea mays* var. *everta*), dent corn (*Zea mays* var. *indentata*), flint corn (*Zea mays* var. *indurate*), sweet corn (*Zea mays* var. *saccharata* and *Zea mays* var. *rugose*), waxy corn (*Zea mays* var. *ceratina*), amylomaize (*Zea mays*), pod corn (*Zea mays* var. *tunicata* Larrañaga ex A. St. Hil.), striped maize (*Zea mays* var. *japonica*); soybean (*Glycine max*); cotton (*Gossypium hirsutum; Gossypium* sp.); peanut (*Arachis hypogaea*); barley (*Hordeum vulgare*); oats (*Avena sativa*); orchard grass (*Dactylis glomerata*); rice (*Oryza sativa*, including *indica* and *japonica* varieties); sorghum (*Sorghum bicolor*); sugarcane (*Saccharum* sp.); tall fescue (*Festuca arundinacea*); turfgrass species (e.g. species: *Agrostis stolonifera, Poa pratensis, Stenotaphrum secundatum*); wheat (*Triticum aestivum*); alfalfa (*Medicago sativa*); members of the genus *Brassica* which include but are not limited to, canola (*Brassica napus* and *Brassica rapa*), members of the genus *Brassica* (e.g. species: bok choy (*B. rapa* subsp. *chinensis*), bomdong (*Brassica rapa* var. *glabra*), choy sum (*Brassica rapa* subsp. *parachinensis*), field mustard (*Brassica rapa* subsp. *oleifera*), komatsuna (*Brassica rapa* subsp. *perviridis*, napa cabbage (*Brassica rapa* subsp. *pekinensis*), rapini (*Brassica rapa* var. *rapifera*), tatsoi (*Brassica rapa* subsp. *narinosa*), turnip (*Brassica rapa* subsp. *rapa*), yellow sarson (*Brassica rapa* subsp. *trilocularis*), Chinese cabbage, turnip, rapini, komatsuna (*Brassica rapa* (syn. *Brassica campestris*)), Mallorca cabbage (*Brassica balearica*), Abyssinian mustard or Abyssinian cabbage, used to produce biodiesel (*Brassica carinata*), elongated mustard (*Brassica elongata*), Mediterranean cabbage (*Brassica. fruticulosa*), St Hilarion cabbage (*Brassica hilarionis*), Indian mustard, brown and leaf mustards, Sarepta mustard (*Brassica juncea*), rapeseed, canola, rutabaga (swede, swede turnip, Swedish turnip) (*Brassica napus*), broadbeaked mustard (*Brassica narinosa*), black mustard (*Brassica nigra*), kale, cabbage, collard greens, broccoli, cauliflower, kai-lan, Brussels sprouts, kohlrabi (*Brassica oleracea*), tender green, mustard spinach (*Brassica perviridis*), brown mustard (*Brassica rupestris*), seventop turnip (*Brassica septiceps*), Asian mustard (*Brassica. tournefortii*), broccoli (*B. oleracea*); pepper (e.g. species: black pepper, white and green pepper (*Piper nigrum*), cubeb (*Piper cubeba*), Indian long pepper (*Piper longum*), Indonesian long pepper (*Piper retrofractum*), Voatsiperifery (*Piper borbonense*), Ashanti pepper (*Piper guineense*), banana pepper, bell pepper, cayenne pepper, jalapeño, Florina pepper, (*Capsicum annuum* cultivars), chili pepper (cultivars of *Capsicum annuum, Capsicum frutescens, Capsicum chinense, Capsicum pubescens,* and *Capsicum baccatum*), and datil pepper (*Capsicum chinense* cultivar); bean plant species (e.g. broad bean or fava bean (*Vicia faba*), common bean; includes the pinto bean, kidney bean, black bean, Appaloosa bean as well as green beans, and many others (*Phaseolus vulgaris*), tepary bean (*Phaseolus acutifolius*), runner bean (*Phaseolus coccineus*), lima bean (*Phaseolus lunatus*), a.k.a. *P. dumosus*, recognized as a separate species in 1995 (*Phaseolus polyanthus*), moth bean (*Vigna aconitifolia*), adzuki bean (*Vigna angularis*), urad bean (*Vigna mungo*), mung bean (*Vigna radiata*), Bambara bean or ground-bean (*Vigna subterranea*), ricebean (*Vigna umbellata*), cowpea; also includes the black-eyed pea, yardlong bean and others (*Vigna unguiculata*), chickpea or garbanzo bean (*Cicer arietinum*), pea (*Pisum sativum*), Indian pea (*Lathyrus sativus*), tuberous pea (*Lathyrus tuberosus*), lentil (*Lens culinaris*), hyacinth bean (*Lablab purpureus*), winged bean (*Psophocarpus tetragonolobus*), pigeon pea (*Cajanus cajan*), velvet bean (*Mucuna pruriens*), guar (*Cyamopsis tetragonoloba*), jack bean (*Canavalia ensiformis*), sword bean (*Canavalia gladiata*), horse gram (*Macrotyloma uniflorum*), tarwi (*Lupinus mutabilis*), lupini bean (*Lupinus albus*); gourd family members (Cucurbitaceae; e.g. genera: squash, pumpkin, zucchini, some gourds (*Cucurbita*), calabash (*Lagenaria*), watermelon (*Citrullus* such as *Citrullus lanatus* and *Citrullus colocynthis*), cucumber (*Cucumis sativus*), various melons (*Cucumis melo, Cucumis metuliferus*); spinach (*Spinacia oleracea*); carrot (*Daucus carota* subsp. *sativus*); tomato (*Solanum lycopersicum*); onion (*Allium cepa* L.); radish (*Raphanus raphanistrum* subsp. *sativus*); potato (*Solanum tuberosum*); ornamental plants; and oilseed crops such as soybean, canola, oil seed rape, oil palm, sunflower, olive, corn, cottonseed, peanut, flaxseed, safflower, and coconut.

The genome modification may comprise a modified linkage block, the linking of two or more QTLs, disrupting linkage of two or more QTLs, gene insertion, gene replacement, gene conversion, deleting or disrupting a gene, transgenic event selection, transgenic trait donor selection, transgene replacement, or targeted insertion of at least one nucleic acid of interest.

Definitions

The definitions and methods provided define the present disclosure and guide those of ordinary skill in the art in the practice of the present disclosure. Unless otherwise noted, terms are to be understood according to conventional usage by those of ordinary skill in the relevant art. Definitions of common terms in molecular biology may also be found in Alberts et al., Molecular Biology of The Cell, 5th Edition, Garland Science Publishing, Inc.: New York, 2007; Rieger et al., Glossary of Genetics: Classical and Molecular, 5th edition, Springer-Verlag: New York, 1991; King et al., A Dictionary of Genetics, 6th ed., Oxford University Press: New York, 15 2247; and Lewin, Genes IX, Oxford University Press: New York, 2007. The nomenclature for DNA bases as set forth at 37 CFR § 1.822 is used.

As used herein, a "synthetic nucleotide sequence" or "artificial nucleotide sequence" is a nucleotide sequence that is not known to occur in nature or that is not naturally occurring. The gene-regulatory elements of the present invention comprise synthetic nucleotide sequences. Preferably, synthetic nucleotide sequences share little or no extended homology to natural sequences. Extended homology in this context generally refers to 100% sequence identity extending beyond about 25 nucleotides of contiguous sequence.

Reference in this application to an "isolated DNA molecule," or an equivalent term or phrase, is intended to mean that the DNA molecule is one that is present alone or in combination with other compositions, but not within its natural environment. For example, nucleic acid elements such as a coding sequence, intron sequence, untranslated leader sequence, promoter sequence, transcriptional termination sequence, and the like, that are naturally found within the DNA of the genome of an organism are not considered to be "isolated" so long as the element is within the genome of the organism and at the location within the genome in which it is naturally found. However, each of these elements, and subparts of these elements, would be "isolated" within the scope of this disclosure so long as the element is not within the genome of the organism and at the location within the genome in which it is naturally found. In one embodiment, the term "isolated" refers to a DNA molecule that is at least partially separated from some of the nucleic acids which normally flank the DNA molecule in its native or natural state. Thus, DNA molecules fused to regulatory or coding sequences with which they are not normally associated, for example as the result of recombinant techniques, are considered isolated herein. Such molecules are considered isolated when integrated into the chromosome of a host cell or present in a nucleic acid solution with other DNA molecules, in that they are not in their native state. For the purposes of this disclosure, any transgenic nucleotide sequence, i.e., the nucleotide sequence of the DNA inserted into the genome of the cells of a plant or bacterium, or present in an extrachromosomal construct, would be considered to be an isolated nucleotide sequence whether it is present within the plasmid or similar structure used to transform the cells, within the genome of the plant or bacterium, or present in detectable amounts in tissues, progeny, biological samples or commodity products derived from the plant or bacterium.

By "heterologous DNA molecule," it is meant that the DNA molecule is heterologous with respect to the polynucleotide sequence to which it is operably linked.

As used herein, the term "operably linked" refers to a first DNA molecule joined to a second DNA molecule, wherein the first and second DNA molecules are so arranged that the first DNA molecule affects the function of the second DNA molecule. The two DNA molecules may or may not be part of a single contiguous DNA molecule and may or may not be adjacent. For example, a promoter is operably linked to a DNA molecule if the promoter modulates transcription of the DNA molecule of interest in a cell. A leader, for example, is operably linked to a DNA sequence when it is capable of affecting the transcription or translation of the DNA sequence.

As used herein, a "recombinant DNA molecule" is a DNA molecule comprising a combination of DNA molecules that would not naturally occur together without human intervention. For instance, a recombinant DNA molecule may be a DNA molecule that is comprised of at least two DNA molecules heterologous with respect to each other, a DNA molecule that comprises a DNA sequence that deviates from DNA sequences that exist in nature, a DNA molecule that comprises a synthetic DNA sequence or a DNA molecule that has been incorporated into a host cell's DNA by genetic transformation or gene editing.

As used herein, the term "sequence identity" refers to the extent to which two optimally aligned polynucleotide sequences or two optimally aligned polypeptide sequences are identical. An optimal sequence alignment is created by manually aligning two sequences, e.g., a reference sequence and another sequence, to maximize the number of nucleotide matches in the sequence alignment with appropriate internal nucleotide insertions, deletions, or gaps. As used herein, the term "reference sequence" refers to a DNA sequence provided as SEQ ID NOs:1-10.

As used herein, the term "percent sequence identity" or "percent identity" or "% identity" is the identity fraction multiplied by 100. The "identity fraction" for a sequence optimally aligned with a reference sequence is the number of nucleotide matches in the optimal alignment, divided by the total number of nucleotides in the reference sequence, e.g., the total number of nucleotides in the full length of the entire reference sequence. Thus, one embodiment of the invention provides a DNA molecule comprising a sequence that, when optimally aligned to a reference sequence, provided herein as any of SEQ ID NOs:1-10, has at least about 85 percent identity, at least about 86 percent identity, at least about 87 percent identity, at least about 88 percent identity, at least about 89 percent identity, at least about 90 percent identity, at least about 91 percent identity, at least about 92 percent identity, at least about 93 percent identity, at least about 94 percent identity, at least about 95 percent identity, at least about 96 percent identity, at least about 97 percent identity, at least about 98 percent identity, at least about 99 percent identity, or at least about 100 percent identity to the reference sequence. In still further specific embodiments, a sequence having a percent identity to any of SEQ ID NOs:1-10 may be defined as exhibiting promoter activity possessed by the starting sequence from which it is derived. A sequence having a percent identity to any of SEQ ID NOs:1-10 may further comprise a "minimal promoter" which provides a basal level of transcription and is comprised of a TATA box or equivalent sequence for recognition and binding of the RNA polymerase III complex for initiation of transcription. In accordance with the invention, a promoter, promoter variant, or promoter fragment may be analyzed for the presence of known promoter elements, i.e., DNA sequence characteristics, such as a TATA box and other known transcription factor binding site motifs. Identification of such known promoter elements may be used by one of skill in the art to design variants of the promoter having a similar expression pattern to the original promoter.

The term "genome" encompasses not only chromosomal DNA found within the nucleus, but organelle DNA found within subcellular components (e.g., mitochondria, or plastid) of the cell.

As used herein, the term "genome editing" or "editing" refers to any modification of a nucleotide sequence in a site-specific manner. In the present disclosure genome editing techniques include the use of endonucleases, recombinases, transposases, helicases and any combination thereof. In an aspect, a "modification" comprises the hydrolytic deamination of cytidine or deoxycytidine to uridine or deoxyuridine, respectively. In some embodiments, a sequence-specific editing system comprises an adenine deaminase. In an aspect, a "modification" comprises the hydrolytic deamination of adenine or adenosine. In an aspect, a "modification" comprises the hydrolytic deamination of adenosine or deoxyadenosine to inosine or deoxyinosine, respectively. In an aspect, a "modification" comprises the insertion of at least 1, at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In another aspect, a "modification" comprises the deletion of at least 1, at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In a further aspect, a "modification" comprises the inversion of at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In still another aspect, a "modification" comprises the substitution of at least 1, at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In still another aspect, a "modification" comprises the duplication of at least 1, at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In some embodiments, a "modification" comprises the substitution of an "A" for a "C", "G" or "T" in a nucleic acid sequence. In some embodiments, a "modification" comprises the substitution of an "C" for a "A", "G" or "T" in a nucleic acid sequence. In some embodiments, a "modification" comprises the substitution of an "G" for a "A", "C" or "T" in a nucleic acid sequence. In some embodiments, a "modification" comprises the substitution of an "T" for a "A", "C" or "G" in a nucleic acid sequence. In some embodiments, a "modification" comprises the substitution of an "C" for a "U" in a nucleic acid sequence. In some embodiments, a "modification" comprises the substitution of an "G" for a "A" in a nucleic acid sequence. In some embodiments, a "modification" comprises the substitution of an "A" for a "G" in a nucleic acid sequence. In some embodiments, a "modification" comprises the substitution of an "T" for a "C" in a nucleic acid sequence.

As used herein, "target site" refers to a nucleotide sequence against which a gRNA/CRISPR associated protein system binds and/or exerts activity (e.g., a protospacer and a protospacer adjacent motif (PAM)) located in DNA sequence that is selected for targeted modification. A target site may be genic or non-genic. A target site may be on a chromosome, episome, a locus, or any other DNA molecule in the genome (including chromosomal, chloroplastic, mitochondrial DNA, plasmid DNA) of a cell. The target site can be an endogenous site in the genome of a cell, or alternatively, the target site can be heterologous to the cell and thereby not be naturally occurring in the genome of the cell, or the target site can be found in a heterologous genomic location compared to where it occurs in nature.

As used herein, "genomic target site" refers to a target site (e.g., a protospacer and a protospacer adjacent motif (PAM)) located in a host genome selected for targeted modification.

As used herein, "protospacer" refers to a short DNA sequence (12 to 40 bp) that can be targeted by a CRISPR system guided by complementary base-pairing with the spacer sequence in the gRNA.

As used herein, "microhomology" refers to the presence of the same short sequence (1 to 10 bp) of bases in different polynucleotide molecules.

As used herein, "codon-optimized" refers to a polynucleotide sequence that has been modified to exploit the codon usage bias of a particular plant. The modified polynucleotide sequence still encodes the same, or substantially similar polypeptide as the original sequence but uses codon nucleotide triplets that are found in greater frequency in a particular plant.

As used herein, "non-protein-coding RNA (npcRNA)" refers to a non-coding RNA (ncRNA) which is a precursor small non-protein coding RNA, or a fully processed non-protein coding RNA, which are functional RNA molecules that are not translated into a protein.

As used herein, "promoter" refers to a nucleic acid sequence located upstream or 5' to a translational start codon of an open reading frame (or protein-coding region) of a gene and that is involved in recognition and binding of RNA polymerase I, II, or III and other proteins (transacting transcription factors) to initiate transcription. A "plant promoter" is a native or non-native promoter that is functional in plant cells. Constitutive promoters are functional in most or all tissues of a plant throughout plant development. Tissue-, organ- or cell-specific promoters are expressed only or predominantly in a particular tissue, organ, or cell type, respectively. Rather than being expressed "specifically" in a given tissue, plant part, or cell type, a promoter may display "enhanced" expression, i.e., a higher level of expression, in one cell type, tissue, or plant part of the plant compared to other parts of the plant. Temporally regulated promoters are functional only or predominantly during certain periods of plant development or at certain times of day, as in the case of genes associated with circadian rhythm, for example. Inducible promoters selectively express an operably linked DNA sequence in response to the presence of an endogenous or exogenous stimulus, for example by chemical compounds (chemical inducers) or in response to environmental, hormonal, chemical, and/or developmental signals. Inducible or regulated promoters include, for example, promoters regulated by light, heat, stress, 5 flooding or drought, phytohormones, wounding, or chemicals such as ethanol, jasmonate, salicylic acid, or safeners.

As used herein, an "expression cassette" refers to a polynucleotide sequence comprising at least a first polynucleotide sequence capable of initiating transcription of an operably linked second polynucleotide sequence and optionally a transcription termination sequence operably linked to the second polynucleotide sequence.

A palindromic sequence is a nucleic acid sequence that is the same whether read 5' to 3' on one strand or 3' to 5' on the complementary strand with which it forms a double helix. A nucleotide sequence is said to be a palindrome if it is equal to its reverse complement. A palindromic sequence can form a hairpin.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability.

Having described the present disclosure in detail, it will be apparent that modifications, variations, and equivalent embodiments are possible without departing from the scope of the present disclosure defined in the appended claims. Furthermore, it should be appreciated that all examples in the present disclosure are provided as non-limiting examples.

EXAMPLES

The following examples are included to demonstrate embodiments of the disclosure. It should be appreciated by those of skill in the art that many changes can be made in the specific embodiments which are disclosed and still obtain a like or similar result without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

Example 1

Synthesis of Promoters to Express gRNA

Novel synthetic transcriptional regulatory elements are synthetic expression elements designed through algorithmic methods. The synthetic promoter elements of the present invention provide transcription of small nuclear RNA (snRNA) molecules such as guide RNA (gRNA) molecules. The designed synthetic snRNA promoter elements do not have extended homology to any known nucleic acid sequences that exist in nature, yet affect transcription of an operably linked DNA sequence the same as naturally occurring snRNA promoters. The full-length synthetic snRNA promoters of the present invention share little sequence identity amongst each other; ranging from about thirty-eight (38) percent identity to about forty-seven (47) percent identity. Truncation variants of the synthetic snRNA promoters were also produced. The truncated synthetic snRNA promoters also share little sequence identity amongst each other; ranging from about forty-one (41) to about fifty-one (51) percent identity. The low percentage identity amongst the synthetic snRNA promoters reduces the likelihood of recombination between promoters and makes the synthetic snRNA promoters ideal for stacking multiple RNA expression cassettes; in which each cassette comprises a different synthetic snRNA promoter. Both the full length and truncated synthetic snRNA promoters demonstrated the ability to drive expression of a gRNA as will be described further in the examples below. Table 1 below shows the different synthetic snRNA promoters and the corresponding truncated variants (denoted with "_TR") and the respective length of each synthetic snRNA promoter.

TABLE 1

Full length and truncated synthetic snRNA promoters.

| Synthetic snRNA Promoter | SEQ ID NO: | Length (bp) |
| --- | --- | --- |
| P-GSP2262 | 1 | 500 |
| P-GSP2268 | 2 | 500 |
| P-GSP2269 | 3 | 500 |
| P-GSP2272 | 4 | 500 |
| P-GSP2273 | 5 | 500 |
| P-GSP2262_TR | 6 | 280 |
| P-GSP2268_TR | 7 | 300 |
| P-GSP2269_TR | 8 | 300 |
| P-GSP2272_TR | 9 | 288 |
| P-GSP2273_TR | 10 | 282 |

Example 2

Analysis of the Synthetic snRNA Promoters in Transfected Corn Leaf Protoplasts

Corn leaf protoplasts are transfected with plasmid constructs, comprising an expression cassette for the expression of a Cas12a endonuclease, driven by a constitutive promoter; and a second expression cassette for the expression of a gRNA driven by a synthetic snRNA promoter.

Plasmid constructs are constructed using methods known in the art comprising two transgene cassettes, a first transgene cassette used for the expression of a nuclear targeted Cas12a protein comprising an EXP, EXP-Zm.UbqM1:1:9 (SEQ ID NO:11), operably linked 5' to coding sequence, Cas12a_NLS (SEQ ID NO:12) encoding a nuclear targeted Cas12a_NLS protein (SEQ ID NO:19), operably linked 5' to a 3' UTR, T-Os.LTP:2 (SEQ ID NO:13); and a second transgene cassette comprising a synthetic snRNA promoter selected from the group consisting of SEQ ID NOs:1-10, operably linked 5' to a guide RNA, gRNA-Zm.Bmr3_2691 (SEQ ID NO:15) which contains the guide RNA spacer, NR-Zm.Bmr3_2691 (SEQ ID NO:14). The gRNA, gRNA-Zm.Bmr3_2691, is designed to direct the Cas12a endonuclease to cut within the brown midrib 3 (Bmr3) genomic sequence (presented as SEQ ID NO:18). The brown midrib mutations are among the earliest described in maize. Plants containing a brown midrib mutation exhibit a reddish-brown pigmentation of the leaf midrib starting when there are four to six leaves. These mutations are known to alter lignin composition and digestibility of plants and therefore constitute prime candidates in the breeding of silage maize. The Bmr3 gene encodes the enzyme O-methyltransferase (COMT) involved in lignin biosynthesis (Vignols et al., 1995, The Plant Cell, Vol. 7, 407-416).

Corn leaf protoplasts are transfected using a PEG-based transfection method, similar to those known in the art. To assess the effectiveness of each of the synthetic snRNA promoters, amplicon fragments are generated using primers that allow for the amplification of a fragment of DNA comprising the cut site region from isolated genomic DNA derived from a population of transfected protoplast cells. The sequences of the amplicon fragments are aligned to identify any fragment sequences comprising mutations such as deletions of DNA at the cut site region. The presence of such mutations is demonstrative of the synthetic snRNA promoter capacity to drive expression of the gRNA.

Example 3

Analysis of Two Synthetic snRNA Promoters in Transfected Corn Leaf Protoplasts

Corn leaf protoplasts are transfected with plasmid constructs, comprising an expression cassette for the expression of a Cas12a endonuclease, driven by a constitutive promoter; and two expression cassettes for the expression of two different gRNAs, each driven by a synthetic snRNA promoter.

Plasmid constructs are constructed using methods known in the art comprising three transgene cassettes, a first transgene cassette used for the expression of a nuclear targeted Cas12a protein comprising an EXP, EXP-Zm.UbqM1:1:9 (SEQ ID NO:11), operably linked 5' to coding sequence, Cas12a_NLS (SEQ ID NO:12) encoding a nuclear targeted Cas12a_NLS protein (SEQ ID NO:19), operably linked 5' to a 3' UTR, T-Os.LTP:2 (SEQ ID NO:13); a second transgene cassette comprising a synthetic snRNA promoter selected from the group consisting of SEQ ID NOs:1-10, operably linked 5' to a guide RNA, gRNA-Zm.Bmr3_2691 (SEQ ID NO:15) which contains the guide RNA spacer, NR-Zm.Bmr3_2691 (SEQ ID NO:14); and a third transgene cassette comprising a second synthetic snRNA promoter selected from the group consisting of SEQ ID NOs:1-10 which is different from the synthetic snRNA promoter used in the second transgene cassette, operably linked 5' to a guide RNA, gRNA-Zm.Bmr3_3170 (SEQ ID NO:17) which contains the guide RNA spacer, NR-Zm.Bmr3_3170 (SEQ ID NO:16). The gRNAs, gRNA-Zm.Bmr3_2691 and gRNA, gRNA-Zm.Bmr3_3170 are designed to direct the Cas12a endonuclease to cut within the brown midrib 3 (Bmr3) genomic sequence (presented as SEQ ID NO:18).

Corn leaf protoplasts are transfected using a PEG-based transfection method, similar to those known in the art. To assess the effectiveness of each of the synthetic snRNA promoters in the construct stack, amplicon fragments are generated using primers that allow for the amplification of a fragment of DNA comprising both cut site regions from isolated genomic DNA derived from a population of transfected protoplast cells. Mutations detected in each of the cut sites or a deletion of approximately 480 base pairs is indicative of each of the synthetic promoters' capacity to drive expression of their respective gRNAs.

Example 4

Introducing a Targeted Double-Strand Break in the Genome of a Cell

This example illustrates the use of the synthetic snRNA promoter sequences to drive gRNA expression to make a targeted double-stranded break in the genome of a cell when presented along with a Cas9 endonuclease, Cas12a endonuclease, or other CRISPR endonuclease.

The synthetic snRNA promoters and truncated variant synthetic snRNA promoters of the present invention, presented as SEQ ID NOs:1-10 can be used to drive gRNA expression in plant cells. When presented to the nucleus of the cell, along with a Cas9 endonuclease, Cas12a endonuclease, or CRISPR endonuclease, a DNA break will occur in a selected target region comprising a sequence complimentary to the spacer region of the gRNA.

There are multiple means by which the necessary components can be introduced to the plant cell. The gRNA may be expressed from a DNA fragment comprising the synthetic snRNA promoter or truncated synthetic snRNA promoter operably linked 5' to a nucleotide sequence encoding the gRNA and a 3' poly-T stretch to terminate transcription. Alternatively, a sequence encoding the gRNA may be cloned into a plasmid construct. The plasmid construct may be a construct used to transfect plant derived protoplasts, or the construct may be a binary plant transformation construct used to stably transform a plant cell. The Cas9 endonuclease, Cas12a endonuclease, or other CRISPR endonuclease may be introduced into the plant cell as a protein or via a heterologous DNA that is used to express the Cas9 endonuclease, Cas12a endonuclease, or other CRISPR endonuclease. The Cas9 endonuclease, Cas12a endonuclease or other CRISPR endonuclease comprises at least one nuclear localization signal (NLS) to more efficiently permit endonuclease cleavage to occur within the nucleus of the cell.

The plant cell can be transfected through particle bombardment. In this instance, the Cas9 endonuclease, Cas12a endonuclease or other CRISPR endonuclease can be introduced as a protein; or alternatively a DNA fragment comprising a plant expressible promoter, operably linked 5' to optionally, an intron which is operably linked 5' to a coding sequence encoding a Cas9 endonuclease, Cas12a endonuclease, or other CRISPR endonuclease comprising at least one NLS, operably linked 5' to a 3' UTR. The DNA encoding the gRNA can be introduced into the cell with a heterologous DNA fragment comprising a synthetic snRNA promoter or truncated synthetic snRNA promoter (SEQ ID NOs:1-10) operably linked 5' to the sequence encoding the gRNA which also comprises a 3' poly-T stretch to terminate transcription. Protoplast cells can also be transfected using the same reagents as described above.

Protoplast cells can also be transfected using one or two plasmid constructs. One such method, wherein two constructs are used described in Example 2 above, wherein a first construct comprises a transgene cassette for the expression of the gRNA, and a second construct comprises the transgene cassette used for expression of a Cas9 endonuclease, Cas12a endonuclease, or other CRISPR endonuclease. Alternatively, both the gRNA transgene cassette and the Cas9 endonuclease, Cas12, or other CRISPR endonuclease transgene cassette can be contained in one construct used for transfection.

To stably transform a plant cell, both the gRNA expression cassette and the Cas9 endonuclease, Cas12a endonuclease, or other CRISPR endonuclease expression cassette can be contained in one binary plant transformation plasmid construct. Alternatively, two constructs can be used to co-transform the plant cell, a first construct comprising the gRNA expression cassette; and a second construct comprising the Cas9 endonuclease, Cas12a endonuclease, or CRISPR endonuclease expression cassette.

To induce a double-stranded break in the DNA without incorporation of the transgene cassettes into the genome of the plant, the gRNA and Cas9 endonuclease, Cas12a endonuclease, or other CRISPR endonuclease expression cassettes can be excised as linear fragments from the construct or constructs that comprised the cassettes. The expression cassettes and blunt-end DNA fragment can be delivered into a plant cell through particle bombardment. The bombarded cells are induced to form callus. The callus is then used to form whole plants.

The resulting break introduced into the genome of the cell can be used to introduce an oligo, DNA fragment; or alter or disrupt a sequence through error-prone, non-homologous end joining.

Example 5

Genome Modification Through Blunt-Ended, Double-Stranded DNA Fragment Integration This example illustrates the use of the synthetic snRNA promoter sequences to drive gRNA expression to integrate a blunt-end, double-stranded DNA fragment into a selected target site, when presented along with a CRISPR endonuclease.

Complimentary oligonucleotides are pre-annealed to form blunt-ended, double-stranded DNA fragments. The DNA fragments and constructs comprising gRNA and CRISPR endonuclease expression cassettes are co-transfected into plant protoplasts. The oligonucleotides can be designed to either contain microhomology regions of about three base pairs to the corresponding 5' and 3' flanking sequence at the cut site in the genomic target site; or not contain microhomology regions. The microhomology regions may promote blunt-end, double-strand DNA fragment integration through a mechanism of microhomology-driven non-homologous end-joining at the genomic target site.

To express the gRNA and the CRISPR endonuclease, one or two constructs can be used. For one construct both the gRNA and Cas9 expression cassettes are cloned into a single plasmid construct. If two constructs are desired, then a first construct will comprise the gRNA expression cassette and a second construct will comprise a cassette for the expression of the CRISPR endonuclease. The gRNA expression cassette will comprise one of the synthetic snRNA promoters or truncated variant synthetic snRNA promoters of the present invention, presented as SEQ ID NOs:1-10.

For protoplast transfection, the construct or constructs comprising the gRNA expression cassette and the CRISPR endonuclease expression cassette are co-transfected along with the blunt-end, double-stranded DNA fragment. Detection of the integration of the blunt-end, double-stranded DNA fragment can be performed through amplification of the region around the target-site integration and detection of amplicons using high-resolution capillary electrophoresis; as well as, directly sequencing the amplicons.

For integration of a blunt-end DNA fragment into a selected target site that results in a stably altered plant, the gRNA and CRISPR endonuclease expression cassettes can be excised as linear fragments from the construct or constructs that comprised the cassettes. The expression cassettes and blunt-end DNA fragment can be delivered into a plant cell through particle bombardment. The bombarded cells are induced to form callus. The callus is then used to form whole plants. The regenerated plants are then assayed using methods known in the art such as amplification and sequencing to identify those plants that comprise the DNA fragment into the genome of the plant.

Example 6

Targeting Multiple Unique Genomic Sites by gRNA Multiplexing

A key advantage of the CRISPR system, as compared to other genome engineering platforms, is that multiple gRNAs directed to separate and unique genomic target sites can be delivered as individual components to effect targeting. Alternatively, multiple gRNAs directed to separate and unique genomic target sites can be multiplexed in a single expression construct to effect targeting. An example of an application that can require multiple targeted endonucleolytic cleavages includes maker-gene removal from a transgenic event. The CRISPR system can be used to remove the selectable marker from the transgenic insert, leaving behind the gene(s) of interest.

Another example of an application which such a CRISPR system can be useful is when there is a requirement for multiple targeted endonucleolytic cleavages, such as when the identification of causal genes behind a quantitative trait is hampered by lack of meiotic recombination in the QTL regions that would separate the gene candidates from each other. This can be circumvented by transformation with several CRISPR constructs targeting the genes of interests simultaneously. These constructs would either knock out the gene candidates by frame shift mutations or remove them by deletion. Such transformation can also lead to random combinations of intact and mutant loci that would allow for identification of causal genes.

The gRNA expression cassettes will comprise two or more of the synthetic snRNA promoters and/or truncated variant synthetic snRNA promoters of the present invention, presented as SEQ ID NOs:1-10, operably linked 5' to unique gRNA coding sequences which are designed to direct CRISPR endonuclease activity to specific sites in the plant cell genomic region. It may be advantageous to use the truncated variant synthetic snRNA promoters (SEQ ID NOs: 6-10) in that the smaller size of the truncated variant synthetic snRNA promoters allows for the construction of smaller constructs and reduces the probability of replication errors occurring in a bacterial host prior to transformation of the plant cells.

Binary plant transformation constructs are constructed similar to those described above in Example 3, but contain multiple gRNA expression cassettes, each with a unique synthetic snRNA promoter or truncated variant synthetic snRNA promoter operably linked 5' to unique gRNA coding sequences. The binary plant transformation construct also comprises an expression cassette used for the expression of a CRISPR endonuclease. Plant cells are transformed using an *Agrobacterium*-mediated transformation method. After transformation, the gRNA will direct the CRISPR endonuclease to the genomic regions comprising a PAM sequence adjacent to a sequence complimentary to the spacer sequence of each gRNA, resulting in endonuclease cleavage within the genomic DNA in each respective target sequence. After cleavage, genomic DNA between the target sites will excise, and the genomic DNA will be repaired by non-homologous end joining. Excision of the fragment of genomic DNA can be confirmed through various amplification or sequencing methods available in the art. Changes in phenotype, metabolism, or other characteristics may be observed, depending upon the nature of the genomic region targeted for excision.

Example 7

Targeted Integration by Homologous Recombination

Genome modification by targeted integration of a desired introduced DNA sequence will occur at sites of double-stranded breaks in a chromosome. The integration of the DNA sequence is mediated by mechanisms of non-homologous end-joining or homologous recombination using DNA repair mechanisms of the host cell. Double-strand breaks in a cell genome can be achieved using a CRISPR endonuclease and an gRNA that directs the CRISPR endonuclease to a target region of the genomic DNA. An example of an application that can require homologous recombination would be the integration of an expression cassette into a plant cell genome, within a specific region of the plant genome.

Integration of a fragment of DNA using homologous recombination requires regions of homology that are identical to the regions wherein integration is preferred after cleavage by the CRISPR endonuclease, herein referred to as "homology arms" (HA). The homology arms flank the 5' and 3' ends of the DNA fragment. The left-HA is designed based on the sequence flanking the 5'-side of the site for the double-stranded break for targeted integration. The right-HA is designed based on the sequence flanking the 3'-side of the site for the double-stranded break for targeted integration. The homology arms can be about two (2) to about one thousand two-hundred (1200) base pairs, but longer homology arms may work more effectively. A desirable range of size for the homology arm can be two hundred thirty (230) to one thousand three (1,003) base pairs in length.

To transfect protoplasts the construct or constructs used for transfection are as those as described above in Example 5. The gRNA expression cassette will comprise one of the synthetic snRNA promoters or truncated variant synthetic snRNA promoters of the present invention, presented as SEQ ID NOs:1-10. The construct or constructs can be co-transfected along with the DNA fragment comprising homology arms. Alternatively, expression cassettes can be excised from the plasmid construct or constructs and the linear expression cassette fragments can be co-transfected along with the DNA fragment comprising homology arms.

For stable integration of the DNA fragment comprising homology arms that results in stably transformed plants comprising the DNA fragment, expression cassettes can be excised from the plasmid construct or constructs and the linear expression cassette fragments can be co-transformed along with the DNA fragment comprising homology arms through particle bombardment. Alternatively, an expression cassette comprising a synthetic snRNA promoter or truncated synthetic snRNA promoter can be co-transformed along with the DNA fragment comprising homology arms through particle bombardment. The transformed tissue is induced to form whole plants and plants are selected for the presence of the integrated DNA fragment and characterized using methods known in the art for insertion into the target site.

For *Agrobacterium*-mediated stable integration of the DNA fragment comprising homology arms that results in stably transformed plants comprising the DNA fragment, a single binary transformation construct can be constructed using methods known in the art. The construct will comprise a right T-DNA border region, a left homology arm flanking for example a first transgene cassette used for the selection of a transformed plant cell using either an herbicide or antibiotic; a second transgene cassette comprising an expression cassette for expression of the gene of interest; a right homology arm; a third transgene cassette comprising a plant expressible promoter operably linked 5' to a coding sequence encoding a nuclear targeted CRISPR endonuclease, operably linked 5' to a 3' UTR; a fourth transgene cassette comprising a synthetic snRNA promoter or truncated synthetic snRNA promoter of the present invention, presented as SEQ ID NOs:1-10, operably linked 5' to a gRNA coding sequence which comprises a poly-T stretch at the 3' end to terminate transcription; and a right T-DNA border. It may be preferable to also flank the selection marker cassette, the CRISPR endonuclease cassette, and the gRNA cassette with sites that would permit the excision of the selectable marker, such as Lox sites which are cleaved by Cre recombinase, after selection and characterization of the transformants.

The use of two right T-DNA border regions will result in the T-DNA forming a double-stranded DNA as a result of the replication process by *Agrobacterium*. The selection and expression cassette flanked by the homology arms will integrate into the target site. Loss of any chromosome integrations of the full-length T-DNA or partial T-DNA can be accomplished in subsequent generations through breeding and segregation by selecting those segregates that only have the selection and expression cassette in the target site. Removal of the selectable marker cassette can be accomplished by breeding the plant comprising the selection and expression cassette with a Cre-recombinase expressing transformed plant. The Cre-recombinase expression cassette can then also be selected against through segregation in the next generation.

Example 8

P-GSP2262_TR can Drive Expression of gRNAs

Corn plants were transformed with plasmid constructs comprising an expression cassette for the expression of Cas12a driven by a plant expressible promoter, and an expression cassette for the expression of a gRNA driven by the synthetic snRNA promoter GSP2262_TR, and assessed for editing within specific regions of the Bmr3 target sequence (SEQ ID NO:18).

Corn plants were transformed using two different plasmid constructs, Construct-1 and Construct-2. Each construct comprised an expression cassette for the selection of transformed plant cells using glyphosate selection and an expression cassette for the expression of Cas12a. Construct-1 also comprised an expression cassette for the expression of a gRNA, gRNA-Zm.Bmr3_90_3279 (SEQ ID NO:23), driven by the synthetic snRNA promoter GSP2262_TR (SEQ ID NO:6). The gRNA, gRNA-Zm.Bmr3_90_3279 comprised two spacer sequences, NR-Zm.Bmr3_90 (SEQ ID NO:20) and NR-Zm.Bmr3_3279 (SEQ ID NO:22) which directed Cas12a to cut within the Bmr3 target sequence (SEQ ID NO:18). Construct-2 also comprised an expression cassette for the expression of a gRNA, gRNA-Zm.Bmr3_227_3279 (SEQ ID NO:24), driven by the synthetic snRNA promoter GSP2262_TR (SEQ ID NO:6). The gRNA, gRNA-Zm.Bmr3_227_3279 comprised two spacer sequences, NR-Zm.Bmr3_227 (SEQ ID NO:21) and NR-Zm.Bmr3_3279 (SEQ ID NO:22) which directed Cas12a to cut within the Bmr3 target sequence (SEQ ID NO:18).

Corn plants were transformed with the two plasmid constructs described above using an *Agrobacterium*-mediated transformation method. The transformed cells were induced to form plants by methods known in the art. Leaf tissue samples were taken from the transformed Ro plants and genomic DNA was extracted from each sample. The regions spanning the target sites were sequenced. A percentage of plants that contained at least 1 edited allele was calculated for each cut site. The percentage of edited target sites is shown in Table 2 below.

TABLE 2

Percentage of edited target sites.

| Construct | Number of Plants | Bmr3_90 | Bmr3_227 | Bmr3_3279 |
|---|---|---|---|---|
| Construct-1 | 46 | 73.9% | | 34.8% |
| Construct-2 | 72 | | 54.2% | 29.2% |

As can be seen in Table 2 above, the synthetic snRNA promoter P-GSP2262_TR (SEQ ID NO:6) was able to drive gRNA expression as evidenced by the percentage of edited sites specific to each gRNA.

Example 9

Assay of the Synthetic snRNA Promoters in Driving Expression of gRNAs that Target the Bmr3 Genomic Locus Using Transfected Protoplasts Corn leaf protoplasts were transfected with constructs, a first construct comprising an expression cassette for the expression of Cas12a driven by a plant expressible promoter and second construct comprising an expression cassette for the expression of gRNAs designed to target the Bmr3 genomic locus driven by a synthetic snRNA promoter; and assessed for the effectiveness of inducing edits within the Bmr3 target sequence (SEQ ID NO:18).

Corn leaf protoplasts were transfected with multiple constructs to assay the capacity of the synthetic snRNA promoters in driving expression of gRNAs, resulting in editing of specific sequences within the Bmr3 target site (SEQ ID NO:18). Each protoplast preparation was transfected with 4 different constructs. A first construct is used to drive the expression of Cas12a (Cas12a_NLS, SEQ ID NO:12) in the protoplast cell using a constitutive promoter. A second construct was used to drive expression of a gRNA targeting the Bmr3 locus, driven by a synthetic snRNA promoter selected from the group consisting of SEQ ID NOs:1-10. A third and fourth construct were used to drive the expression of the Renilla and Firefly luciferase genes, respectively using constitutive promoters to assess the success of protoplast transfection.

The second construct used to drive expression of a gRNA, driven by a synthetic snRNA promoter selected from the group consisting of SEQ ID NOs:1-10 comprised one of three different gRNAs: (1) gRNA-Zm.Brm3_2691_2 (SEQ ID NO:25) which comprises the spacer, NR-Zm.Brm3_2691 (SEQ ID NO:14) and directs the Cas12a_NLS protein to cut within the Bmr3 target sequence; (2) gRNA-Zm.Brm3_3170_2 (SEQ ID NO:26) which comprises the spacer, NR-Zm.Brm3_3170 (SEQ ID NO:16) and directs the Cas12a_NLS protein to cut within the Bmr3 target sequence; and (3) gRNA-Zm.Brm3_2691_3170 (SEQ ID NO:27) which directs Cas12a_NLS to cut within both positions of the Bmr3 target sequence. 30 total constructs were made to provide all three gRNAs for each of the 10 synthetic snRNA promoters.

Corn leaf protoplasts were transfected using a PEG-based transfection method, similar to those known in the art, with the 5 types of constructs described above (first, second, third, fourth, and fifth). Genomic DNA was isolated from the protoplast cells after transfection and incubation. DNA sequencing was performed around the target regions of the Bmr3 target site. Each transfection was repeated 4 times and an average % InDel was calculated based upon the 4 reps. The percentage of InDel was calculated as follows: % InDel=100×[(In+Del)/(TotalRC)], wherein "In" is the read count with insertions; "Del" is the read count with deletions; "TotalRC" is the read count for all sequences from a given sample which includes wildtype and mutant reads. Since each guide RNA differs with respect to efficiency of inducing a double stranded break, the % InDels for each gRNA driven by the 10 synthetic snRNA promoters were normalized using the rep from any of the 10 snRNA promoters that had the highest % InDel as 100%. Table 3 shows the average % InDel and average normalized % InDel corresponding to the two single target gRNAs, gRNA-Zm.Brm3_2691_2 (SEQ ID NO:25) and gRNA-Zm.Brm3_3170_2 (SEQ ID NO:26). Table 4 shows the average % InDel and average normalized % InDel corresponding to the 2 target gRNA, gRNA-Zm.Brm3_2691_3170 (SEQ ID NO:27).

TABLE 3

Average % InDel and average normalized % InDel for single target gRNAs driven by the synthetic snRNA promoters.

| | | gRNA-Zm.Brm3_2691_2 | | | gRNA-Zm.Brm3_3170_2 | | |
|---|---|---|---|---|---|---|---|
| Promoter | SEQ ID NO: | TotalRC 2691 | Average 2691 % InDel | Average Normalized 2691 % InDel | TotalRC 3170 | Average 3170 % InDel | Average Normalized 3170 % InDel |
| GSP2262 | 1 | 488327 | 0.00 | 0.33 | 365710 | 2.46 | 34.86 |
| GSP2262_TR | 6 | 549272 | 0.10 | 16.31 | 411883 | 2.73 | 38.60 |
| GSP2268 | 2 | 529722 | 0.20 | 33.11 | 299659 | 5.56 | 78.72 |
| GSP2268_TR | 7 | 519534 | 0.40 | 66.69 | 370899 | 4.51 | 63.83 |
| GSP2269 | 3 | 615736 | 0.26 | 43.66 | 189373 | 5.24 | 74.28 |
| GSP2269_TR | 8 | 556010 | 0.22 | 36.61 | 186424 | 3.44 | 48.66 |
| GSP2272 | 4 | 606406 | 0.09 | 15.43 | 346748 | 2.21 | 31.28 |
| GSP2272_TR | 9 | 480712 | 0.02 | 3.10 | 222334 | 1.52 | 21.59 |
| GSP2273 | 5 | 586122 | 0.52 | 87.92 | 294914 | 5.84 | 82.76 |
| GSP2273_TR | 10 | 599776 | 0.47 | 79.05 | 178964 | 6.04 | 85.61 |

TABLE 4

Average % InDel and average normalized % InDel for a 2 target gRNAs driven by the synthetic snRNA promoters.

| | | gRNA-Zm.Brm3_2691_3170 | | | | | |
|---|---|---|---|---|---|---|---|
| Promoter | SEQ ID NO: | TotalRC 2691 | TotalRC 3170 | Average 2691 % InDel | Average 3170 % InDel | Average Normalized 2691 % InDel | Average Normalized 3170 % InDel |
| GSP2262 | 1 | 4384464 | 4935835 | 1.16 | 1.68 | 48.66 | 35.93 |
| GSP2262_TR | 6 | 4358893 | 3842681 | 1.21 | 2.21 | 50.99 | 47.28 |
| GSP2268 | 2 | 4803526 | 3068955 | 1.94 | 3.19 | 81.61 | 68.33 |
| GSP2268_TR | 7 | 4841676 | 3598934 | 1.70 | 3.58 | 71.63 | 76.51 |
| GSP2269 | 3 | 4829192 | 4742278 | 1.79 | 3.63 | 75.33 | 77.55 |
| GSP2269_TR | 8 | 4756003 | 4781980 | 2.07 | 4.43 | 87.11 | 94.72 |
| GSP2272 | 4 | 4563760 | 4167208 | 1.03 | 1.71 | 43.43 | 36.48 |
| GSP2272_TR | 9 | 4890024 | 3961909 | 1.14 | 1.30 | 47.83 | 27.76 |
| GSP2273 | 5 | 4721992 | 3817633 | 1.69 | 3.60 | 71.34 | 76.91 |
| GSP2273_TR | 10 | 4903415 | 4655373 | 1.86 | 3.98 | 78.38 | 85.19 |

As can be seen in Tables 3 and 4, each of the synthetic snRNA promoters were able to drive gRNA expression to direct Cas12a editing in the target sites. In these experiments, the gRNA, gRNA-Zm.Brm3_2691_2 appeared to be less efficient than the other 2 gRNAs, resulting in low average % InDels, particularly for promoters GSP2262, GSP2272, and GSP2272_TR. However, these 3 synthetic snRNA promoters demonstrated % InDels similar to the other synthetic snRNA promoters when driving the gRNAs, gRNA-Zm.Brm3_3170_2 and gRNA-Zm.Brm3_2691_3170.

Example 10

Assay of the Synthetic snRNA Promoters in Driving Expression of gRNAs that Target the Zm7 Genomic Locus Using Transfected Protoplasts Corn leaf protoplasts were transfected with constructs, a first construct comprising an expression cassette for the expression of Cas12a driven by a plant expressible promoter and second construct comprising an expression cassette for the expression of gRNAs designed to target the Bmr3 genomic locus driven by a synthetic snRNA promoter; and assessed for the effectiveness of inducing edits within the Zm7 target sequence (SEQ ID NO:28).

Corn leaf protoplasts were transfected with multiple constructs to assay the capacity of the synthetic snRNA promoters in driving expression of gRNAs, resulting in editing of specific sequences within the Zm7 target site (SEQ ID NO:28). Each protoplast preparation was transfected with 4 different constructs. A first construct was used to drive the expression of Cas12a (Cas12a_NLS, SEQ ID NO:12) in the protoplast cell using a constitutive promoter. A second construct was used to drive expression of a gRNA targeting the Zm7 locus, driven by a synthetic snRNA promoter selected from the group consisting of SEQ ID NOs:1-10. A third and fourth construct was used to drive the expression of the Renilla and Firefly luciferase genes, respectively using constitutive promoters to assess the success of protoplast transfection.

The second construct used to drive expression of a gRNA, driven by a synthetic snRNA promoter selected from the group consisting of SEQ ID NOs:1-10 comprised one of three different gRNAs: (1) gRNA-Zm.7.1b (SEQ ID NO:30) which comprises the spacer, NR-Zm.7.1b (SEQ ID NO:29) and directs the Cas12a_NLS protein to cut within the Zm7 target sequence; (2) gRNA-Zm.7.1c (SEQ ID NO:32) which comprises the spacer, NR-Zm.7.1c (SEQ ID NO:31) and directs the Cas12a_NLS protein to cut within the Zm7 target sequence; and (3) gRNA-7.1c_7.1b (SEQ ID NO:33) which directs Cas12a_NLS to cut within both positions of the Zm7 target sequence. 30 total constructs were made to provide all three gRNAs for each of the 10 synthetic snRNA promoters.

Corn leaf protoplasts were transfected using a PEG-based transfection method, similar to those known in the art, with the 5 types of constructs described above (first, second, third, fourth, and fifth). Genomic DNA was isolated from the protoplast cells after transfection and incubation. DNA sequencing was performed around the target regions of the Bmr3 target site. Each transfection was repeated 4 times and an average % InDel was calculated based upon the 4 reps. The % InDel and normalization of the % InDel was calculated as described in Example 9 above.

Tables 5 shows the average % InDel and average normalized % InDel corresponding to the two single target gRNAs, gRNA-Zm.7.1b (SEQ ID NO:30) and gRNA-Zm.7.1c (SEQ ID NO:32). Table 6 shows the average % InDel and average normalized % InDel corresponding to the 2 target gRNA, gRNA-7.1c_7.1b (SEQ ID NO:33).

TABLE 5

Average % InDel and average normalized % InDel for single target gRNAs driven by the synthetic snRNA promoters.

| | | gRNA-Zm.7.1b | | | gRNA-Zm.7.1c | | |
|---|---|---|---|---|---|---|---|
| Promoter | SEQ ID NO: | TotalRC 7.1b | Average 7.1b % InDel | Average Normalized 7.1b % InDel | TotalRC 7.1c | Average 7.1c % InDel | Average Normalized 7.1c % InDel |
| GSP2262 | 1 | 98826 | 0.10 | 7.94 | 280488 | 4.40 | 46.11 |
| GSP2262_TR | 6 | 75827 | 0.25 | 20.37 | 232322 | 5.18 | 54.23 |

TABLE 5-continued

Average % InDel and average normalized % InDel for single target gRNAs driven by the synthetic snRNA promoters.

| Promoter | SEQ ID NO: | gRNA-Zm.7.1b | | | gRNA-Zm.7.1c | | |
|---|---|---|---|---|---|---|---|
| | | TotalRC 7.1b | Average 7.1b % InDel | Average Normalized 7.1b % InDel | TotalRC 7.1c | Average 7.1c % InDel | Average Normalized 7.1c % InDel |
| GSP2268 | 2 | 53492 | 0.73 | 60.53 | 268565 | 7.54 | 78.94 |
| GSP2268_TR | 7 | 70892 | 0.83 | 68.81 | 183924 | 6.48 | 67.84 |
| GSP2269 | 3 | 94028 | 0.70 | 58.17 | 267655 | 7.35 | 76.97 |
| GSP2269_TR | 8 | 101803 | 0.54 | 44.95 | 291714 | 6.37 | 66.75 |
| GSP2272 | 4 | 70762 | 0.27 | 22.29 | 275162 | 4.78 | 50.07 |
| GSP2272_TR | 9 | 84778 | 0.22 | 18.12 | 223741 | 3.96 | 41.49 |
| GSP2273 | 5 | 83170 | 0.85 | 70.67 | 238447 | 6.92 | 72.49 |
| GSP2273_TR | 10 | 95158 | 0.99 | 81.95 | 236556 | 7.49 | 78.40 |

TABLE 6

Average % InDel and average normalized % InDel for a 2 target gRNAs driven by the synthetic snRNA promoters.

| Promoter | SEQ ID NO: | gRNA-7.1c_7.1b | | | | | |
|---|---|---|---|---|---|---|---|
| | | TotalRC 7.1b | TotalRC 7.1c | Average 7.1b % InDel | Average 7.1c % InDel | Average Normalized 7.1b % InDel | Average Normalized 7.1c % InDel |
| GSP2262 | 1 | 3451081 | 3887730 | 0.12 | 7.06 | 10.77 | 62.32 |
| GSP2262_TR | 6 | 3441268 | 3409184 | 0.18 | 8.04 | 15.64 | 70.97 |
| GSP2268 | 2 | 3291948 | 3895260 | 0.70 | 8.37 | 61.60 | 73.92 |
| GSP2268_TR | 7 | 3755829 | 2735617 | 0.70 | 8.49 | 61.14 | 74.95 |
| GSP2269 | 3 | 4371243 | 4173222 | 1.10 | 10.08 | 96.46 | 88.94 |
| GSP2269_TR | 8 | 4240281 | 3795393 | 0.96 | 9.29 | 83.94 | 81.99 |
| GSP2272 | 4 | 3592816 | 3753339 | 0.20 | 7.99 | 17.42 | 70.51 |
| GSP2272_TR | 9 | 3532683 | 2912817 | 0.01 | 0.32 | 0.96 | 2.85 |
| GSP2273 | 5 | 3701787 | 3473794 | 0.67 | 8.68 | 58.74 | 76.60 |
| GSP2273_TR | 10 | 3904334 | 3600320 | 0.72 | 8.28 | 63.32 | 73.05 |

As can be seen in Tables 3 and 4, each of the synthetic snRNA promoters were able to drive gRNA expression to direct Cas12a editing in the target sites. Editing of the Zm.7.1b site was less efficient than in the Zm.7.1c site. However, the synthetic snRNA promoters were able to drive expression of the gRNAs to affect editing by Cas12a.

Example 11

Assay of the Synthetic snRNA Promoters in Driving Expression of gRNAs that Target the Bmr3 Genomic Locus in Stably Transformed Corn Plants Corn plants were transformed with plasmid constructs comprising an expression cassette for the expression of Cas12a driven by a plant expressible promoter, and an expression cassette for the expression of a gRNA driven by the synthetic snRNA promoters presented as SEQ ID NOs: 6-10; and assessed for editing within specific regions of the Bmr3 target sequence (SEQ ID NO:18).

Corn plants were transformed with 5 plasmid constructs comprising 3 expression cassettes, a first expression cassette for the selection of transformed plant cells using glyphosate selection, a second expression cassette for expression of Cas12a using a plant expressible promoter, and a third transgene cassette for the expression of a gRNA, gRNA-Zm.Brm3_2691_3170 (SEQ ID NO:27) driven by the synthetic snRNA promoters presented as SEQ ID NOs:6-10 which directed Cas12a to cut within two regions of the Bmr3 target sequence (SEQ ID NO:18).

Corn plants were transformed with the two plasmid constructs described above using an Agrobacterium-mediated transformation method. The transformed cells were induced to form plants by methods known in the art. Leaf tissue samples were taken from the transformed Ro plants and genomic DNA was extracted from each sample. One and two copy events were selected and the regions spanning the target sites were sequenced. An average InDel Percentage was calculated based upon the number of insertions and deletions observed for each target site. Table 7 shows the average InDel percentage calculated for each of the two target sites within the Bmr3 target sequence.

TABLE 7

Average InDel percentage within the Bmr3 target sequence.

| Promoter | SEQ ID NO: | Number of Events | Total Sequence Reads | | Average Indel Percentage | |
|---|---|---|---|---|---|---|
| | | | Bmr3_2691 | Bmr3_3170 | Bmr3_2691 | Bmr3_3170 |
| GSP2262_TR | 6 | 14 | 863899 | 969980 | 10.4 | 32.4 |
| GSP2268_TR | 7 | 35 | 76919 | 85369 | 30.6 | 51.1 |
| GSP2269_TR | 8 | 35 | 1613667 | 1751876 | 27.7 | 49.3 |
| GSP2272_TR | 9 | 10 | 691667 | 724469 | 5.1 | 22.2 |
| GSP2273_TR | 10 | 18 | 646871 | 805384 | 19.4 | 46.3 |

As can be seen in Table 7 above, each of the synthetic snRNA promoters were able to drive gRNA expression to direct Cas12a editing in the target sites of the Bmr3 target sequence.

Example 12

Assay of the Synthetic snRNA Promoters in Driving Expression of gRNAs that Target the Zm7 Genomic Locus in Stably Transformed Corn Plants Corn plants were transformed with plasmid constructs comprising an expression cassette for the expression of Cas12a driven by a plant expressible promoter, and an expression cassette for the expression of a gRNA driven by the synthetic snRNA promoters presented as SEQ ID NOs: 6-10; and assessed for editing within specific regions of the Zm7 target sequence (SEQ ID NO:28).

Corn plants were transformed with 5 plasmid constructs comprising 3 expression cassettes, a first expression cassette for the selection of transformed plant cells using glyphosate selection, a second expression cassette for expression of Cas12a using a plant expressible promoter, and a third transgene cassette for the expression of a gRNA, gRNA-7.1c_7.1b (SEQ ID NO:33) driven by the synthetic snRNA promoters presented as SEQ ID NOs:6-10 which directed Cas12a to cut within two regions of the Zm7 target sequence (SEQ ID NO:28).

Corn plants were transformed with the two plasmid constructs described above using an *Agrobacterium*-mediated transformation method. The transformed cells were induced to form plants by methods known in the art. Leaf tissue samples were taken from the transformed Ro plants and genomic DNA was extracted from each sample. One and two copy events were selected and the regions spanning the target sites were sequenced. An average InDel Percentage was calculated based upon the number of insertions and deletions observed for each target site. Table 8 shows the average InDel percentage calculated for each of the two target sites within the Zm7 target sequence (SEQ ID NO:28).

TABLE 8

Average InDel percentage within the Zm7 target sequence.

| Promoter | SEQ ID NO: | Number of Events | Total Sequence Reads | | Average Indel Percentage | |
|---|---|---|---|---|---|---|
| | | | Zm7.1b | Zm7.1c | Zm7.1b | Zm7.1c |
| GSP2262_TR | 6 | 32 | 4798896 | 2843652 | 18.7 | 60.6 |
| GSP2268_TR | 7 | 29 | 5047750 | 2198986 | 23.3 | 58.0 |
| GSP2269_TR | 8 | 35 | 5112663 | 2346132 | 20.7 | 53.2 |
| GSP2272_TR | 9 | 32 | 4498840 | 1970822 | 16.2 | 44.3 |
| GSP2273_TR | 10 | 39 | 4332962 | 3000445 | 29.1 | 65.4 |

As can be seen in Table 8 above, each of the synthetic snRNA promoters were able to drive gRNA expression to direct Cas12a editing in the target sites of the Zm7 target sequence.

Having illustrated and described the principles of the present invention, it should be apparent to persons skilled in the art that the invention can be modified in arrangement and detail without departing from such principles. We claim all modifications that are within the spirit and scope of the claims. All publications and published patent documents cited herein are hereby incorporated by reference to the same extent as if each individual publication or patent application is specifically and individually indicated to be incorporated by reference.

What is claimed is:

1. A synthetic small nuclear RNA (snRNA) promoter comprising a DNA sequence selected from the group consisting of:
   a) a sequence with at least 95% sequence identity to SEQ ID NO:1 or 6 and having promoter activity;
   b) a sequence comprising SEQ ID NO: 1 or 6; and
   c) a fragment comprising at least 300 contiguous nucleotides of SEQ ID NO:1, wherein said fragment has promoter activity.

2. The synthetic snRNA promoter of claim 1, wherein said sequence has at least 97% percent sequence identity to the DNA sequence of SEQ ID NO:1 or 6 and has promoter activity.

3. The synthetic snRNA promoter of claim 1, wherein said sequence has at least 99% percent sequence identity to the DNA sequence of SEQ ID NO:1 or 6 and has promoter activity.

4. A recombinant DNA construct comprising the synthetic snRNA promoter of claim 1, operably linked to a DNA sequence encoding a guide RNA (gRNA).

5. The recombinant DNA construct of claim 4, further comprising a transcription termination sequence.

6. The recombinant DNA construct of claim 4, further comprising a DNA sequence encoding a promoter operably linked to a Type I CRISPR-associated protein, a Type II CRISPR-associated protein, a Type III CRISPR-associated protein, a Type IV CRISPR-associated protein, Type V CRISPR-associated protein, or a Type VI CRISPR-associated protein.

7. The recombinant DNA construct of claim 6, wherein CRISPR-associated protein is further operably linked to at least one nuclear localization sequence (NLS).

8. The recombinant DNA construct of claim 6, wherein the CRISPR-associated protein is selected from the group consisting of: Cas1, Cas1B, Cas2, Cas3, Cas4, Cas5, Cas6, Cas7, Cas8, Cas9, Cas10, Cas 12a, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, CasX, CasY, and Mad7.

9. A recombinant DNA construct comprising the synthetic snRNA promoter of claim 1, operably linked to a sequence specifying a non-coding RNA.

10. The recombinant DNA construct of claim 9, wherein the non-coding RNA is selected from the group consisting of: a guide RNA (gRNA), a single-guide RNA (sgRNA), a crRNA, a pre-crRNA, a tracrRNA, a PERNA, a microRNA (miRNA), a miRNA precursor, a small interfering RNA (siRNA), a small RNA (22-26 nt in length) and precursor encoding same, a heterochromatic siRNA (hc-siRNA), a Piwi-interacting RNA (piRNA), a hairpin double-strand RNA (hairpin dsRNA), a trans-acting siRNA (ta-siRNA), and a naturally occurring antisense siRNA (nat-siRNA).

11. A recombinant DNA construct comprising at least a first expression cassette comprising the synthetic snRNA promoter of claim 1, operably linked to a DNA sequence encoding a guide RNA (gRNA).

12. A recombinant DNA construct comprising:
a) a first synthetic snRNA promoter comprising SEQ ID NO:1 or 6, or a fragment comprising at least 300 contiguous nucleotides of SEQ ID NO:1, wherein said fragment has promoter activity, operably linked to a DNA sequence encoding a non-coding RNA; and
b) a second synthetic snRNA promoter operably linked to a DNA sequence encoding a non-coding RNA,
wherein the first synthetic snRNA promoter and the second synthetic snRNA promoter are different.

13. The recombinant DNA construct of claim 12, further comprising one or more additional synthetic snRNA promoters operably linked to a DNA sequence encoding a non-coding RNA, wherein the first synthetic snRNA promoter, the second synthetic snRNA promoter, and each of the one or more additional synthetic snRNA promoters are different.

14. The recombinant DNA construct of claim 13, wherein the recombinant DNA construct comprises 3, 4, 5, 6, 7, or 8 synthetic snRNA promoters.

15. The recombinant DNA construct of claim 12, wherein the non-coding RNAs are gRNAs targeting different selected target sites in a chromosome of a plant cell.

16. The recombinant DNA construct of claim 12, further comprising a DNA sequence encoding a promoter operably linked to a DNA sequence encoding a CRISPR-associated protein.

17. The recombinant DNA construct of claim 16, wherein the CRISPR-associated protein is selected from the group consisting of: Cas1, Cas1B, Cas2, Cas3, Cas4, Cas5, Cas6, Cas7, Cas8, Cas9, Cas10, Cas 12a, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, CasX, CasY, and Mad7.

18. A cell comprising a recombinant DNA construct comprising the synthetic snRNA promoter of claim 1.

19. The cell of claim 18, wherein the cell is a plant cell.

20. The plant cell of claim 19, wherein the plant cell is a monocotyledonous plant cell.

21. The plant cell of claim 19, wherein the plant cell is a dicotyledonous plant cell.

22. The plant cell of claim 19, wherein the plant cell is selected from the group consisting of: a maize plant cell, a soybean plant cell, a cotton plant cell, a peanut plant cell, a barley plant cell, an oat plant cell, an orchard grass plant cell, a rice plant cell, a sorghum plant cell, a sugarcane plant cell, a tall fescue plant cell, a turfgrass plant cell, a wheat plant cell, an alfalfa plant cell, a canola plant cell, a cabbage plant cell, a mustard plant cell, a rutabaga plant cell, a turnip plant cell, a kale plant cell, a broccoli plant cell, a cauliflower plant cell, a pepper plant cell, a bean plant cell, a cowpea plant cell, a chickpea plant cell, a gourd plant cell, a lettuce plant cell, a cucumber plant cell, a melon plant cell, a carrot plant cell, a tomato plant cell, a radish plant cell, a potato plant cell, and an ornamental plant cell.

23. The synthetic small nuclear RNA (snRNA) promoter of claim 1, wherein the DNA sequence comprises at least 95% sequence identity to SEQ ID NO:1 and has promoter activity.

24. The synthetic small nuclear RNA (snRNA) promoter of claim 1, wherein the DNA sequence comprises at least 95% sequence identity to SEQ ID NO:6 and has promoter activity.

25. The synthetic small nuclear RNA (snRNA) promoter of claim 1, wherein the DNA sequence comprises a sequence comprising SEQ ID NO:1.

26. The synthetic small nuclear RNA (snRNA) promoter of claim 1, wherein the DNA sequence comprises a sequence comprising SEQ ID NO:6.

27. The synthetic small nuclear RNA (snRNA) promoter of claim 1, wherein the DNA sequence comprises a fragment having at least 300 contiguous nucleotides of SEQ ID NO:1, wherein the fragment has promoter activity.

\* \* \* \* \*

SEQUENCE LISTING

```
<160> NUMBER OF SEQ ID NOS: 33

<210> SEQ ID NO 1
<211> LENGTH: 500
<212> TYPE: DNA
<213> ORGANISM: Artificial
<220> FEATURE:
<223> OTHER INFORMATION: DNA sequence of the synthetic snRNA promoter,
      P-GSP2262.

<400> SEQUENCE: 1
gttattgtta tatagcacgt tggaggcaga atcttcaacg tcttgagtgc aggtcttctg      60
aataaatctt ttttctcgac caagccgttg tgcaaaggtc aaaaaaggtg tctagcggct     120
gtttaaagaa aaggaatcaa aggaggaacg attgctgctg cttgctttgc tttctatcgc     180
caggattgac agttcgctga actgttggcc aagattacag aatctgtgaa gagtttattc     240
acgattaatc taggaggaag cgcgctttgt tggctgtagg cccaaagcag caatcaacag     300
agtgtgtgag ggccagctgc tggaaggttc ggttttttca acaggcccac acgcgcgggc     360
tgggctgggc tgggctggcc acgttccttc ggtagcagtt cggtggagca acgaggacgg     420
tggaatcgaa gtttagtacc acctcggctg aagatacgga gaaagaccag tttataacct     480
gcctctggag cctgctgctc                                                 500

<210> SEQ ID NO 2
<211> LENGTH: 500
<212> TYPE: DNA
<213> ORGANISM: Artificial
<220> FEATURE:
<223> OTHER INFORMATION: DNA sequence of the synthetic snRNA promoter,
      P-GSP2268.

<400> SEQUENCE: 2
ctcgaggagg tcgcagcggc gatttgttgc caacgtaacc ttcagctcgc gaggcaaaaa      60
ttcttttcct tcgccgctca acacggaatc gaagaccacc tcgctgtttc tcgattttac     120
cttgtttcac tcagagtgag ctgagtgaga aaaccaataa taacggtgaa tcagcagcaa     180
gttcaaattg tattgcgttt tcttataagg aaacagcact acttactttt tagtaccctc     240
gttcaagaaa gaaggcccaa acgcaagact gggtcgctga gcaacagagg acgcggtggg     300
cgtgtgtgca aggcctctgc tgaagaagac aggaaggttg ggctactact gctaaaagat     360
aaagcccacg gcccagaagc ccaagatcgg ttcggtgctg ggagcgcgcg cgcttagcga     420
gcagccagta ggtttagtac cacatcggct gctcacaaag cgaaagacca gtttataagg     480
tgacctgctc actcactctc                                                 500

<210> SEQ ID NO 3
<211> LENGTH: 500
<212> TYPE: DNA
<213> ORGANISM: Artificial
<220> FEATURE:
<223> OTHER INFORMATION: DNA sequence of the synthetic snRNA promoter,
      P-GSP2269.
```

<400> SEQUENCE: 3

```
ttgtggaatc gaggagctgc tcaaagttca acgtaacctt tcagaagctg aattacaaaa        60
gaccacctcg acttctcacg gagtaccagc tgtgagctta ctcttagac tttagtggtg        120
tccaatcgac ttttttaaag aagatctggg tgtgcagttg ttctagacca gccgtacact       180
gagcaagagt ttttctttta gtaacagagt gcaaggttag tacagtcaac ggcaacagtt      240
taagtgagct taaagtcaag cgctggtgag gcccaacaag cgtcaacagc aacgagaggc      300
tctctgctgg gccagcaaaa actggaaagc gggccgaaga aacgcggctg cccacctct       360
tcgctggctt tttattgaag cccagctctg ggtgggagcg caagcgctta cgagcgttgg      420
ccacgagcag agtttagtac cacatcggct gcgtagagcc agctagacca ctttataacg      480
caagctgcag cttgatcctc                                                  500
```

<210> SEQ ID NO 4
<211> LENGTH: 500
<212> TYPE: DNA
<213> ORGANISM: Artificial
<220> FEATURE:
<223> OTHER INFORMATION: DNA sequence of the synthetic snRNA promoter, P-GSP2272.

<400> SEQUENCE: 4

```
tatagacgat atcacgctgc tgccgtcaac agaaggtcgg tgaagctgaa aatttcgaac        60
ggtgtgtgct agtagttttc ttttttagca agaccacctc ttgttagctt cttttcaaaa      120
aggaactgag ctgacttgat actagtacgg aataacggaa taagctaatt tcagacggtg      180
tctgcaaacg ttttttttagt accagcagtg tcgctgaagt gaagtgtgtg tccttcttct    240
acttgcaccc agctgaggcc caaagtgttc gcgtacacaa ggcgagaggc aaacgaggct      300
gggtgggccc acaaagaaag ccacttgctg cttgtcaagc taaagcccgt gctggctggc      360
tggctggccc acaagatata cagaagcgct ctggagcgcg cgcttctgg aacgagcgct       420
aggcaatcga agtttagtac cacatcggct gctcaagcta gcgaacacca gcttataagc     480
ttaactccga gcctctgctc                                                  500
```

<210> SEQ ID NO 5
<211> LENGTH: 500
<212> TYPE: DNA
<213> ORGANISM: Artificial
<220> FEATURE:
<223> OTHER INFORMATION: DNA sequence of the synthetic snRNA promoter, P-GSP2273.

<400> SEQUENCE: 5

```
tctatttcaa gctgaactgc tgccctgctc ggtgttcagc agaagctcgg ccgtaaaagg        60
gaatcttggt tgtgctaaaa gtacttctgt actagttact cgcagctgac gcgcgcactg      120
aacgtacttg tgtttagtaa tttcgaaaaa ttcagatcaa aagccgtatt ctacgtaacg      180
attggggcag actgcagtac cagcactgac gacagcactt accagctctg tgaaacttca     240
cgaaacgcaa tcggaaaacg aggtgggctg tgttacacag ctgggcctgt gtcaacagca      300
acgaagccca cccaacagag gattgggcct cgatcaagcg gcctcacaac gtgcggacac      360
gcggtgcgag gccactctgt cagcagaagc ccggctggga gcaacgagca acttgtgcgc      420
tgcgctgaag gttagtacc acatcggttg cgtaacgacc agcttaccac ctttataagct      480
taaaccggag cgctgctttc                                                  500
```

```
<210> SEQ ID NO 6
<211> LENGTH: 280
<212> TYPE: DNA
<213> ORGANISM: Artificial
<220> FEATURE:
<223> OTHER INFORMATION: DNA sequence of the truncation variant
      synthetic snRNA promoter P-GSP2262_TR, derived from P-GSP2262.

<400> SEQUENCE: 6
aatctgtgaa gagtttattc acgattaatc taggaggaag cgcgctttgt tggctgtagg      60
cccaaagcag caatcaacag agtgtgtgag ggccagctgc tggaaggttc ggttttttca     120
acaggcccac acgcgcgggc tgggctgggc tgggctggcc acgttccttc ggtagcagtt     180
cggtggagca acgaggacgg tggaatcgaa gtttagtacc acctcggctg aagatacgga     240
gaaagaccag tttataacct gcctctggag cctgctgctc                           280

<210> SEQ ID NO 7
<211> LENGTH: 300
<212> TYPE: DNA
<213> ORGANISM: Artificial
<220> FEATURE:
<223> OTHER INFORMATION: DNA sequence of the truncation variant
      synthetic snRNA promoter P-GSP2268_TR, derived from P-GSP2268.

<400> SEQUENCE: 7
tcttataagg aaacagcact acttactttt tagtaccctc gttcaagaaa gaaggcccaa      60
acgcaagact gggtcgctga gcaacagagg acgcggtggg cgtgtgtgca aggcctctgc     120
tgaagaagac aggaaggttg ggctactact gctaaaagat aaagcccacg gcccagaagc     180
ccaagatcgg ttcggtgctg ggagcgcgcg cgcttagcga gcagccagta ggtttagtac     240
cacatcggct gctcacaaag cgaaagacca gtttataagg tgacctgctc actcactctc     300

<210> SEQ ID NO 8
<211> LENGTH: 300
<212> TYPE: DNA
<213> ORGANISM: Artificial
<220> FEATURE:
<223> OTHER INFORMATION: DNA sequence of the truncation variant
      synthetic snRNA promoter P-GSP2269_TR, derived from P-GSP2269.

<400> SEQUENCE: 8
gtaacagagt gcaaggttag tacagtcaac ggcaacagtt taagtgagct taaagtcaag      60
cgctggtgag gcccaacaag cgtcaacagc aacgagaggc tctctgctgg gccagcaaaa     120
actggaaagc gggccgaaga aacgcggctg gcccacctct tcgctggctt tttattgaag     180
cccagctctg ggtgggagcg caagcgctta cgagcgttgg ccacgagcag agtttagtac     240
cacatcggct gcgtagagcc agctagacca ctttataacg caagctgcag cttgatcctc     300

<210> SEQ ID NO 9
<211> LENGTH: 288
<212> TYPE: DNA
<213> ORGANISM: Artificial
<220> FEATURE:
<223> OTHER INFORMATION: DNA sequence of the truncation variant
      synthetic snRNA promoter P-GSP2272_TR, derived from P-GSP2272.

<400> SEQUENCE: 9
gctgaagtga agtgtgtgtc cttcttctac ttgcacccag ctgaggccca agtgttcgc       60 gtacacaagg cgagaggcaa acgaggctgg gtgggcccac aaagaaagcc acttgctgct     120
tgtcaagcta aagcccgtgc tggctggctg gctggcccac aagatataca gaagcgctct     180
```

-continued

```
ggagcgcggc gcttctggaa cgagcgctag gcaatcgaag tttagtacca catcggctgc    240
tcaagctagc gaacaccagc ttataagctt aactccgagc ctctgctc                288
```

<210> SEQ ID NO 10
<211> LENGTH: 282
<212> TYPE: DNA
<213> ORGANISM: Artificial
<220> FEATURE:
<223> OTHER INFORMATION: DNA sequence of the truncation variant
      synthetic snRNA promoter P-GSP2273_TR, derived from P-GSP2273.

<400> SEQUENCE: 10

```
ttaccagctc tgtgaaactt cacgaaacgc aatcggaaaa cgaggtgggc tgtgttacac    60
agctgggcct gtgtcaacag caacgaagcc cacccaacag aggattgggc ctcgatcaag   120
cggcctcaca acgtgcggac acgcggtgcg aggccactct gtcagcagaa gcccggctgg   180
gagcaacgag caacttgtgc gctgcgctga aggtttagta ccacatcggt tgcgtaacga   240
ccagcttacc accttataag cttaaaccgg agcgctgctt tc                      282
```

<210> SEQ ID NO 11
<211> LENGTH: 2008
<212> TYPE: DNA
<213> ORGANISM: Zea mays
<220> FEATURE:
<221> NAME/KEY: misc_feature
<222> LOCATION: (1)..(2008)
<223> OTHER INFORMATION: DNA sequence of an EXP, EXP-Zm.UbqM1:1:9
      comprised of a promoter, leader, and intron derived from a Zea may
      Mexicana Ubiquitin gene.

<400> SEQUENCE: 11

```
gtcgtgcccc tctctagaga taaagagcat tgcatgtcta agtataaaaa aattaccaca    60
tatttttttg tcacacttat ttgaagtgta gtttatctat ctctatacat atatttaaac   120
ttcactctac aaataatata gtctataata ctaaaataat attagtgttt tagaggatca   180
tataaataaa ctgctagaca tggtctaaag gataattgaa tattttgaca atctacagtt   240
ttatcttttt agtgtgcatg tgatctctct gttttttttg caaatagctt gacctatata   300
atacttcatc cattttatta gtacatccat ttaggattta gggttgatgg tttctataga   360 ctaatttta gtacatccat tttattcttt ttagtctcta aatttttaa aactaaaact    420 ctattttagt tttttattta ataatttaga tataaaatga aataaaataa attgactaca   480
aataaaacaa atacccttta agaaataaaa aaactaagca aacatttttc ttgtttcgag   540
tagataatga caggctgttc aacgccgtcg acgagtctaa cggacaccaa ccagcgaacc   600
agcagcgtcg cgtcgggcca agcgaagcag acggcacggc atctctgtag ctgcctctgg   660 accctctcg agagttccgc tccaccgttg gacttgctcc gctgtcggca tccagaaatt   720
gcgtggcgga gcggcagacg tgaggcggca cggcaggcgg cctcttcctc ctctcacggc   780
accggcagct acggggatt cctttcccac cgctccttcg ctttccttc ctcgcccgcc    840 gtaataaata gacaccccct ccacaccctc tttccccaac ctcgtgttcg ttcggagcgc   900 acacacgcc aaccagatct cccccaaatc cagccgtcgg cacctccgct tcaaggtacg    960
ccgctcatcc tccccccccc cctctctcta ccttctctag atcggcgatc cggtccatgg  1020
ttagggcccg gtagttctac ttctgttcat gtttgtgtta gagcaaacat gttcatgttc  1080
atgtttgtga tgatgtggtc tggttgggcg gtcgttctag atcggagtag gatactgttt  1140
caagctacct ggtggattta ttaatttgt atctgtatgt gtgtgccata catcttcata  1200
```

| | |
|---|---|
| gttacgagtt taagatgatg gatggaaata tcgatctagg ataggtatac atgttgatgc | 1260 |
| gggtttttact gatgcatata cagagatgct ttttttctcg cttggttgtg atgatatggt | 1320 |
| ctggttgggc ggtcgttcta gatcggagta gaatactgtt tcaaactacc tggtggattt | 1380 |
| attaaaggat aaagggtcgt tctagatcgg agtagaatac tgtttcaaac tacctggtgg | 1440 |
| atttattaaa ggatctgtat gtatgtgcct acatcttcat agttacgagt ttaagatgat | 1500 |
| ggatggaaat atcgatctag gataggtata catgttgatg cgggttttac tgatgcatat | 1560 |
| acagagatgc ttttttttcgc ttggttgtga tgatgtggtc tggttgggcg gtcgttctag | 1620 |
| atcggagtag aatactgttt caaactacct ggtggattta ttaattttgt atctttatgt | 1680 |
| gtgtgccata catcttcata gttacgagtt taagatgatg gatggaaata ttgatctagg | 1740 |
| ataggtatac atgttgatgt gggttttact gatgcatata catgatggca tatgcggcat | 1800 |
| ctattcatat gctctaacct tgagtaccta tctattataa taaacaagta tgttttataa | 1860 |
| ttattttgat cttgatatac ttggatgatg gcatatgcag cagctatatg tggattttt | 1920 |
| agccctgcct tcatacgcta tttatttgct tggtactgtt tcttttgtcc gatgctcacc | 1980 |
| ctgttgtttg gtgatacttc tgcaggtc | 2008 |

<210> SEQ ID NO 12
<211> LENGTH: 3750
<212> TYPE: DNA
<213> ORGANISM: Artificial
<220> FEATURE:
<223> OTHER INFORMATION: DNA sequence encoding a nuclear targeted Cas12a protein, Cas12a_NLS.

<400> SEQUENCE: 12

| | |
|---|---|
| atggcgggat ctaagaagag aagaattaaa caagattcga agctcgagaa gttcaccaac | 60 |
| tgctactcgc tgagcaagac gctgcggttc aaggcgatcc ccgtcgggaa gacccaggag | 120 |
| aacatcgaca caagcggct cctggtcgag gacgagaagc gcgccgagga ctacaagggc | 180 |
| gtcaagaagc tgctggaccg gtactacctc tccttcatca cgacgtcct gcactcgatc | 240 |
| aagctcaaga acctgaacaa ctacatctcg ctgttccgca agaagacacg gaccgagaag | 300 |
| gagaacaagg agctcgagaa cctcgagatc aacctgcgca aggagatcgc gaaggcgttc | 360 |
| aagggcaacg aggggtacaa gagcctgttc aagaaagaca tcatcgagac catcctgccg | 420 |
| gagttcctgg acgacaagga cgagatcgcg ctggtgaact cgttcaacgg gttcaccacg | 480 |
| gccttcaccg ggttttttcga caaccgggag aacatgttca gcgaggaggc caagtcgacc | 540 |
| agcatcgcct tccggtgcat caacgagaac ctcacccgct acatcagcaa catggacatc | 600 |
| ttcgagaagg tggacgccat cttcgacaag cacgaggtcc aggagatcaa ggaaaagatc | 660 |
| ctgaactcgg actacgacgt ggaagacttc tttgagggcg agttcttcaa cttcgtcctc | 720 |
| acccaggagg gcatcgacgt ctacaacgcc atcatcggcg gcttcgtgac ggagagcggc | 780 |
| gagaagatca gggcctcaa cgagtacatc aacctctaca accagaagac taagcagaag | 840 |
| ctccccgaagt tcaagccgct gtacaagcaa gtcctgagcg accgggagtc cctctcgttc | 900 |
| tacggcgagg gctacacgag cgacgaggag gtgctggagg tgttccgcaa cacgctgaac | 960 |
| aagaacagcg agatcttcag ctcgatcaag aaactcgaga agctgttcaa gaacttcgac | 1020 |
| gagtacagca gcgccggcat cttcgtcaag aacgggcccg cgatcagcac catcagcaag | 1080 |
| gacatcttcg gggagtggaa cgtgatccgc gacaagtgga acgccgagta cgacgacatc | 1140 |
| cacctcaaga aaaaggcggt ggtcacggag aagtacgagg acgaccgccg gaagtccttc | 1200 |

```
aagaaaatcg ggagcttcag cctcgagcag ctccaggagt acgcggacgc cgacctgagc    1260
gtggtggaga agctcaagga gatcatcatc cagaaggtcg acgagatcta caaggtctac    1320
ggctcgagcg agaagctgtt cgacgcggac ttcgtgctgg agaagtccct caagaagaac    1380
gacgccgtgg tggccatcat gaaggatctg ctcgacagcg tgaagtcgtt cgagaactac    1440
atcaaggcat tctttgggga gggcaaggag acgaaccggg acgagtcctt ctacggggac    1500
ttcgtgctcg cgtacgacat cctcctgaag gtcgaccaca tctacgacgc gatccggaac    1560
tacgtcacgc agaagcccta cagcaaggac aagttcaagc tctacttcca gaacccgcag    1620
ttcatgggcg ggtgggacaa ggacaaggag accgactacc gggccacgat cctgcggtac    1680
gggtccaagt actacctcgc catcatggac aagaagtacg ccaagtgcct ccagaagatt    1740
gacaaggacg acgtgaacgg gaactacgag aagatcaact acaagctcct cccgggggccc    1800 aacaagatgc tgccgaaggt gttcttcagc aagaagtgga tggcctacta caaccctcg    1860 gaggacatcc agaagatata caagaacggc acgttcaaaa aggggacat gttcaacctg    1920 aacgactgcc acaagctgat cgactttttc aaggacagca tcagccgcta cccgaagtgg    1980
tcgaacgcct acgacttcaa cttctcggag acggagaagt acaaggacat tgcgggcttc    2040
taccgggagg tggaggagca gggctacaag gtctccttcg agacgcctc caagaaagag    2100 gtggacaagc tcgtggagga gggcaagctg tacatgttcc agatctacaa caaggacttc    2160
tcggacaagt cgcacggcac cccgaacctc cacacgatgt acttcaagct gctgttcgac    2220
gagaacaacc acgggcagat ccgcctcagc ggcggggcgg agctgttcat gcgccgcgcg    2280
tccctcaaga aggaggagct ggtcgtgcac cccgccaact ccccgatcgc gaacaagaac    2340
cccgacaacc ccaagaagac aaccaccctc tcgtacgacg tctacaagga caagcggttc    2400
tcggaggacc agtacgagct gcacatcccg atcgccatca acaagtgccc caagaacatc    2460
ttcaagatca caccgaggt gcgggtgctg ctcaagcacg acgacaaccc ctacgtcatc    2520
gggatcgacc gcgcgagcg gaacctgctc tacatcgtgg tcgtggacgg gaaggggaac    2580
atcgtggagc agtacagcct gaacgagatc atcaacaact tcaacggcat ccgcatcaag    2640
acggactacc acagcctcct ggacaagaag gagaaggagc ggttcgaggc gcggcagaac    2700
tggacctcca tcgagaacat caaggagctg aaggccggct acatcagcca ggtcgtgcac    2760
aagatctgcg agctcgtgga gaagtacgac gcggtgatcg cgctggagga cttgaacagc    2820
gggttcaaga actcccgggt caaggtcgag aagcaggtct accagaagtt cgagaagatg    2880
ctgatcgaca agctcaacta catggtcgac aagaagtcca cccctgcgc caccggcggc    2940 gccctcaagg gctaccagat caccaacaag ttcgagtcct tcaagtcgat gtctacgcag    3000
aacgggttca ttttctacat cccggcgtgg ctcaccagca agatcgaccc gagcacgggc    3060
ttcgtcaacc tcctgaagac caagtacacc agcatcgcgg acagcaagaa gttcatctcc    3120
tcgttcgacc gcatcatgta cgtccccgag gaagacctgt tcgagttcgc cctcgactac    3180
aagaacttct cccggacgga cgccgactac atcaaaaagt ggaagctcta cagctacggc    3240
aaccggatcc gcatcttccg caaccccaag aagaacaatg tgttcgactg ggaggaggtg    3300
tgcctgacga gcgccctacaa ggagctcttc aacaagtacg gcatcaacta ccagcaaggg    3360
gacatccgcg cgctgctctg cgagcagtcc gacaaggcgt tctactcgtc gttcatggcc    3420
ctgatgagcc tcatgctcca gatgcgcaac agcatcaccg gcggacgga cgtggacttc    3480 ctgatcagcc cggtcaagaa cagcgacggc attttctacg acagccggaa ctacgaggcc    3540
caggagaacg ccatcctccc caagaacgcc gacgcgaacg gcgcctacaa catcgcgcgg    3600
```

-continued

```
aaggtgctgt gggccatcgg ccagtttaaa aaggcggagg acgagaagct ggacaaggtc    3660
aagatcgcca tcagcaacaa ggagtggctc gagtacgcgc agacgagcgt gaagcacgga    3720
tctaagaaga gaagaattaa acaagattga                                     3750
```

<210> SEQ ID NO 13
<211> LENGTH: 298
<212> TYPE: DNA
<213> ORGANISM: Zea mays
<220> FEATURE:
<221> NAME/KEY: misc_feature
<222> LOCATION: (1)..(298)
<223> OTHER INFORMATION: DNA sequence of the 3' UTR, T-Os.LTP:2.

<400> SEQUENCE: 13

```
taatcgatcc tccgatccct taattaccat accattacac catgcatcaa tatccatata     60
tatataaacc ctttcgcacg tacttatact atgttttgtc atacatatat atgtgtcgaa    120
cgatcgatct atcactgata tgatatgatt gatccatcag cctgatctct gtatcttgtt    180
atttgtatac cgtcaaataa aagtttcttc cacttgtgtt aataattagc tactctcatc    240
tcatgaaccc tatataaac tagtttaatt tgctgtcaat tgaacatgat gatcgatg      298
```

<210> SEQ ID NO 14
<211> LENGTH: 23
<212> TYPE: DNA
<213> ORGANISM: Zea mays
<220> FEATURE:
<221> NAME/KEY: misc_feature
<222> LOCATION: (1)..(23)
<223> OTHER INFORMATION: DNA sequence of a guide RNA spacer,
    NR-Zm.Brm3_2691.

<400> SEQUENCE: 14

```
cggcagcgcg tcgtagcagt tct                                             23
```

<210> SEQ ID NO 15
<211> LENGTH: 70
<212> TYPE: DNA
<213> ORGANISM: Artificial
<220> FEATURE:
<223> OTHER INFORMATION: DNA sequence of a guide RNA, gRNA-Zm.Brm3_2691.

<400> SEQUENCE: 15

```
gaatttctac taagtgtaga tcggcagcgc gtcgtagcag ttctaatttc tactaagtgt     60
agatttttt                                                             70
```

<210> SEQ ID NO 16
<211> LENGTH: 23
<212> TYPE: DNA
<213> ORGANISM: Zea mays
<220> FEATURE:
<221> NAME/KEY: misc_feature
<222> LOCATION: (1)..(23)
<223> OTHER INFORMATION: DNA sequence of a guide RNA spacer,
    NR-Zm.Brm3_3170.

<400> SEQUENCE: 16

```
gaatccacga catgcaagag ctc                                             23
```

<210> SEQ ID NO 17
<211> LENGTH: 70
<212> TYPE: DNA
<213> ORGANISM: Artificial
<220> FEATURE:

<223> OTHER INFORMATION: DNA sequence of a guide RNA, gRNA-Zm.Brm3_3170.

<400> SEQUENCE: 17

```
gaatttctac taagtgtaga tgaatccacg acatgcaaga gctcaatttc tactaagtgt    60
agattttttt                                                           70
```

<210> SEQ ID NO 18
<211> LENGTH: 3955
<212> TYPE: DNA
<213> ORGANISM: Zea mays
<220> FEATURE:
<221> NAME/KEY: misc_feature
<222> LOCATION: (1)..(3955)
<223> OTHER INFORMATION: DNA sequence of the Zea mays Brown midrib 3
      (Brm3) genomic region targeted for genome editing.

<400> SEQUENCE: 18

```
ataaaaagtt gtagatctta aaaagttatt aaactttata gttagttagc aacttttcg     60 tttaaattcg tttagtgcta caaacaatcg atttatattc ggtttgtttt aatatgcgga    120
caacaaacct ataatctaaa cataagttaa agttagtgat gggtaaagtg gtagagaagt    180
gaggttagag tttcgattcg cgaaaggtcc tacaacaaac ctaaaatctt tttttgctat    240
ttattttaaa acatggttta tatttccaaa aaatgtatt ggcggttttt aactcaggcg     300
ccaacaaaaa ttgatttcca cggcagctgc caccgtcgtt atcgctgacc aacccggctg    360
gtcgcctgtc tgctccatcc atgcatgtta caactatgca gatgcagccg aaacaaacac    420
tggctagaaa ggcagccaac gggcctactg tcattcgctc cggcatccta ctggtgggcc    480
cagttgcacc ggccgatgac cagttcatca tttttctcga cgaatttgtg cacagatcga    540
atttactaaa aattcttcgc acgtggcaaa accaggggaa aaatcgagaa ctagtcgggt    600 tttttatat tccctgatag aatagtccct gctattcatc catgaaaacc aaacacgtac     660
actacgtcac cgtcatggat gggagcgagt gaactgatga ttttttcccc accccgcacg    720
caacagcatg ggtgacaaca accactcccg ctgcggttgg gcgagcacat ctctacgcac    780
ttgacactca cgcaaaccta acgcatacta gagtaatcat cgccaccaac tatcggcgac    840
agaaacgatg ggccccgctt ctcttaatca cggtgcttga attagtgcgc gcatagtagt    900
gaaaataata gtgaaaaata agcagtgcgt gttttggtgt ggtggttggt gagccgtccg    960
gcccaataaa aaccctcgca ccacctcgtc cctcttcgtc gcatcgcacg ccatcagcta   1020
gcagctagcg cgctcctcga gcccagcaga gaaaggccgg cagcgctaat cgtaatagcc   1080
atgggctcca ccgccggcga cgtggccgcg gtggtggacg aggaggcgtg catgtacgcg   1140
atgcagctgg cgtcgtcgtc catcctgccc atgacgctga agaacgccat cgagctgggc   1200
ctgctggagg tgctgcagaa ggaggccggc ggcggcaagg cggcgctggc gcccgaggag   1260
gtggtggcgc ggatgcccgc ggcgcccggc gaccccgccg ccgcggcggc catggtggac   1320
cgcatgctcc gcctgctcgc ctcctacgac gtcgtccggt gccagatgga ggaccgggac   1380
ggccggtacg agcgccgcta ctccgccgcg cccgtctgca gtggctcac ccccaacgag    1440 gacggcgtgt ccatggccgc cctcgcgctc atgaaccagg acaaggtcct catggagagc   1500
tggtgagtag tagccgcatc gcatcaacca ccttctacct atctatatcc atcacttgtt   1560
gctgctggcg tgcgcggcat gcatgatgac gagctcgctc atcattggtg ctactagtga   1620
tttatttcgt ccagtaaaat taattaaggt gcgctgctac tctactggct gcggctagca   1680
caaggctgga aatagttgtt acttgttata cacgatataa tatttctcta gaacaaaaag   1740
```

| | |
|---|---|
| atttttttttt ttataaaaag caagcaagaa agaaagtgag tgacttcatg ttttttcctaa | 1800 |
| aaaaaagtta ggagtgggat ggaaaagtca gcaaggacca cttgtttgtt gtccactatc | 1860 |
| catccagtgg gtgagacttt tttgcgagac ggagcactat attattggcc gagtcctttt | 1920 |
| tctgtatccg caaaacggca gccgtcgatc gccggacgga tcgacggctc acatgagtgt | 1980 |
| cgagtccaat tccaaccacg agggcggcaa ggaaaaccat ccgtgctggt ctggactttt | 2040 |
| tgccaaactc cattcagcca ttcgccgact gaaggtgaat cttcagacag ccagattgtt | 2100 |
| tggtgtctag tgtgtgcgaa gatggcgtag aaaagactga gagacagttg gctcacacag | 2160 |
| acaagtgaca actgactata gtatctgcct gcctggctga tgctgataga gatggggact | 2220 |
| cttgtcctgt ctgtttcttg tatgcgctga tctgattctg atcactgcca ctctgccagg | 2280 |
| tactatctca aggacgcggt gctggacggc ggcatcccgt tcaacaaggc gtacgggatg | 2340 |
| acggcgttcg agtaccacgg gacggacccg cgcttcaacc gcgtgttcaa cgagggcatg | 2400 |
| aagaaccact cggtgatcat caccaagaag ctgctggact tctacacggg cttcgagggc | 2460 |
| gtgtcgacgc tggtggacgt gggcggcggc gtgggcgcca cgctgcacgc catcacgtcc | 2520 |
| cgccacccgc acatctccgg ggtcaacttc gacctgccgc acgtcatctc cgaggcgccg | 2580 |
| ccgttccccg gcgtgcgcca cgtgggcggg gacatgttcg cgtccgtgcc cgccggcgac | 2640 |
| gccatcctca tgaagtggat cctccacgac tggagcgacg cgcactgcgc cacgctgctc | 2700 |
| aagaactgct acgacgcgct gccggaaaat ggcaaggtca tcgtcgtcga gtgcgtgctg | 2760 |
| ccggtcaaca cggaggccac ccccaaggcg cagggcgtgt tccacgtcga catgatcatg | 2820 |
| ctcgcgcaca acccaggcgg caaggagcgg tacgagcgcg agttccgcga gctcgccaag | 2880 |
| ggcgccggct tctccgggtt caaggccacc tacatctacg ccaacgcctg gccatcgag | 2940 |
| ttcatcaagt gaatacggct accaccgtcg ccgcgatgag atgcatggct gccacatgca | 3000 |
| tgcttgcttg cttggtcctc gtatcgtacg tcgccgtcgt cgtcttcttc tggttgcgct | 3060 |
| gctaccttgc tgctctcgcc ctcgcgtatg catgtacttt tgcttaatt tctttcttca | 3120 |
| tatcatgcac tctggctggc ctagactgcc cccgatctat gctggccggt acgtcttgtc | 3180 |
| gagctcttgc atgtcgtgga ttctaaattc ttcttctgcg tcgaattgtc tctgccatgt | 3240 |
| gcgagtaata acaatcaagg ttatacttac catacaatta catggcggtt taattgctct | 3300 |
| cttttaattt ggtgaagaat cgaatcgatt ctactgaatt cttctctgtc gtttaatgaa | 3360 |
| atttcctttg tcttttggat tatataatat aacacagaca ctcacaaaga cactcacaac | 3420 |
| gtgcgcacac tcattcctat aaacgcacac gcgcaaatcc tactcctatc aagtatcaac | 3480 |
| actttcaaga cttgaactgg tcataccgga gaaaatggac tttcgttcga ggacataatt | 3540 |
| acgtgttgct ttagaaccaa taccaactca atcatcaaca tcacttttta actgttagta | 3600 |
| tcggtttgtg tcttcaataa gtactaatgt taagtcatta acaccggttg aatacaccaa | 3660 |
| ctgccgaaga ttgttcgaca gtgaatatac gaggtatgtc tatgaatgaa acggacgga | 3720 |
| aacggtcgga aaaatcaatc tcccatttcg gtttccatttt tttatcaaaa acaggagcgg | 3780 |
| gagcgatata gcaagaaata gaaaaggtag tgggatatac ggttacacga aaacggatta | 3840 |
| aaacaaacgg atatgcaacg aaaatggatg ctaatcggaa actttggctg gaatatgcaa | 3900 |
| tattttataa tcactcaacg actacaatat taagagttta gaatactata aatca | 3955 |

<210> SEQ ID NO 19
<211> LENGTH: 1249
<212> TYPE: PRT
<213> ORGANISM: Artificial

```
<220> FEATURE:
<223> OTHER INFORMATION: Amino acid sequence of Cas12a_NLS encoded by
      SEQ ID NO:12.

<400> SEQUENCE: 19

Met Ala Gly Ser Lys Lys Arg Arg Ile Lys Gln Asp Ser Lys Leu Glu
1               5                   10                  15

Lys Phe Thr Asn Cys Tyr Ser Leu Ser Lys Thr Leu Arg Phe Lys Ala
            20                  25                  30

Ile Pro Val Gly Lys Thr Gln Glu Asn Ile Asp Asn Lys Arg Leu Leu
        35                  40                  45

Val Glu Asp Glu Lys Arg Ala Glu Asp Tyr Lys Gly Val Lys Lys Leu
50                  55                  60

Leu Asp Arg Tyr Tyr Leu Ser Phe Ile Asn Asp Val Leu His Ser Ile
65                  70                  75                  80

Lys Leu Lys Asn Leu Asn Asn Tyr Ile Ser Leu Phe Arg Lys Lys Thr
                85                  90                  95

Arg Thr Glu Lys Glu Asn Lys Glu Leu Glu Asn Leu Glu Ile Asn Leu
            100                 105                 110

Arg Lys Glu Ile Ala Lys Ala Phe Lys Gly Asn Glu Gly Tyr Lys Ser
        115                 120                 125

Leu Phe Lys Lys Asp Ile Ile Glu Thr Ile Leu Pro Glu Phe Leu Asp
130                 135                 140

Asp Lys Asp Glu Ile Ala Leu Val Asn Ser Phe Asn Gly Phe Thr Thr
145                 150                 155                 160

Ala Phe Thr Gly Phe Phe Asp Asn Arg Glu Asn Met Phe Ser Glu Glu
                165                 170                 175

Ala Lys Ser Thr Ser Ile Ala Phe Arg Cys Ile Asn Glu Asn Leu Thr
            180                 185                 190

Arg Tyr Ile Ser Asn Met Asp Ile Phe Glu Lys Val Asp Ala Ile Phe
        195                 200                 205

Asp Lys His Glu Val Gln Glu Ile Lys Glu Lys Ile Leu Asn Ser Asp
210                 215                 220

Tyr Asp Val Glu Asp Phe Phe Glu Gly Glu Phe Phe Asn Phe Val Leu
225                 230                 235                 240

Thr Gln Glu Gly Ile Asp Val Tyr Asn Ala Ile Ile Gly Gly Phe Val
                245                 250                 255

Thr Glu Ser Gly Glu Lys Ile Lys Gly Leu Asn Glu Tyr Ile Asn Leu
            260                 265                 270

Tyr Asn Gln Lys Thr Lys Gln Lys Leu Pro Lys Phe Lys Pro Leu Tyr
        275                 280                 285

Lys Gln Val Leu Ser Asp Arg Glu Ser Leu Ser Phe Tyr Gly Glu Gly
290                 295                 300

Tyr Thr Ser Asp Glu Glu Val Leu Glu Val Phe Arg Asn Thr Leu Asn
305                 310                 315                 320

Lys Asn Ser Glu Ile Phe Ser Ser Ile Lys Lys Leu Glu Lys Leu Phe
                325                 330                 335

Lys Asn Phe Asp Glu Tyr Ser Ser Ala Gly Ile Phe Val Lys Asn Gly
            340                 345                 350

Pro Ala Ile Ser Thr Ile Ser Lys Asp Ile Phe Gly Glu Trp Asn Val
        355                 360                 365

Ile Arg Asp Lys Trp Asn Ala Glu Tyr Asp Asp Ile His Leu Lys Lys
370                 375                 380

Lys Ala Val Val Thr Glu Lys Tyr Glu Asp Asp Arg Arg Lys Ser Phe
```

-continued

```
                385                 390                 395                 400
Lys Lys Ile Gly Ser Phe Ser Leu Glu Gln Leu Gln Glu Tyr Ala Asp
                405                 410                 415

Ala Asp Leu Ser Val Val Glu Lys Leu Lys Glu Ile Ile Ile Gln Lys
            420                 425                 430

Val Asp Glu Ile Tyr Lys Val Tyr Gly Ser Ser Glu Lys Leu Phe Asp
            435                 440                 445

Ala Asp Phe Val Leu Glu Lys Ser Leu Lys Asn Asp Ala Val Val
        450                 455                 460

Ala Ile Met Lys Asp Leu Leu Asp Ser Val Lys Ser Phe Glu Asn Tyr
465                 470                 475                 480

Ile Lys Ala Phe Phe Gly Glu Gly Lys Glu Thr Asn Arg Asp Glu Ser
                485                 490                 495

Phe Tyr Gly Asp Phe Val Leu Ala Tyr Asp Ile Leu Leu Lys Val Asp
                500                 505                 510

His Ile Tyr Asp Ala Ile Arg Asn Tyr Val Thr Gln Lys Pro Tyr Ser
            515                 520                 525

Lys Asp Lys Phe Lys Leu Tyr Phe Gln Asn Pro Gln Phe Met Gly Gly
        530                 535                 540

Trp Asp Lys Asp Lys Glu Thr Asp Tyr Arg Ala Thr Ile Leu Arg Tyr
545                 550                 555                 560

Gly Ser Lys Tyr Tyr Leu Ala Ile Met Asp Lys Lys Tyr Ala Lys Cys
                565                 570                 575

Leu Gln Lys Ile Asp Lys Asp Val Asn Gly Asn Tyr Glu Lys Ile
            580                 585                 590

Asn Tyr Lys Leu Leu Pro Gly Pro Asn Lys Met Leu Pro Lys Val Phe
        595                 600                 605

Phe Ser Lys Lys Trp Met Ala Tyr Tyr Asn Pro Ser Glu Asp Ile Gln
    610                 615                 620

Lys Ile Tyr Lys Asn Gly Thr Phe Lys Lys Gly Asp Met Phe Asn Leu
625                 630                 635                 640

Asn Asp Cys His Lys Leu Ile Asp Phe Phe Lys Asp Ser Ile Ser Arg
                645                 650                 655

Tyr Pro Lys Trp Ser Asn Ala Tyr Asp Phe Asn Phe Ser Glu Thr Glu
                660                 665                 670

Lys Tyr Lys Asp Ile Ala Gly Phe Tyr Arg Glu Val Glu Glu Gln Gly
            675                 680                 685

Tyr Lys Val Ser Phe Glu Ser Ala Ser Lys Lys Glu Val Asp Lys Leu
        690                 695                 700

Val Glu Glu Gly Lys Leu Tyr Met Phe Gln Ile Tyr Asn Lys Asp Phe
705                 710                 715                 720

Ser Asp Lys Ser His Gly Thr Pro Asn Leu His Thr Met Tyr Phe Lys
            725                 730                 735

Leu Leu Phe Asp Glu Asn Asn His Gly Gln Ile Arg Leu Ser Gly Gly
            740                 745                 750

Ala Glu Leu Phe Met Arg Arg Ala Ser Leu Lys Lys Glu Glu Leu Val
        755                 760                 765

Val His Pro Ala Asn Ser Pro Ile Ala Asn Lys Asn Pro Asp Asn Pro
    770                 775                 780

Lys Lys Thr Thr Thr Leu Ser Tyr Asp Val Tyr Lys Asp Lys Arg Phe
785                 790                 795                 800

Ser Glu Asp Gln Tyr Glu Leu His Ile Pro Ile Ala Ile Asn Lys Cys
                805                 810                 815
```

-continued

Pro Lys Asn Ile Phe Lys Ile Asn Thr Glu Val Arg Val Leu Leu Lys
                820             825             830

His Asp Asp Asn Pro Tyr Val Ile Gly Ile Asp Arg Gly Glu Arg Asn
            835             840             845

Leu Leu Tyr Ile Val Val Val Asp Gly Lys Gly Asn Ile Val Glu Gln
    850             855             860

Tyr Ser Leu Asn Glu Ile Ile Asn Asn Phe Asn Gly Ile Arg Ile Lys
865             870             875             880

Thr Asp Tyr His Ser Leu Leu Asp Lys Lys Glu Lys Glu Arg Phe Glu
                885             890             895

Ala Arg Gln Asn Trp Thr Ser Ile Glu Asn Ile Lys Glu Leu Lys Ala
                900             905             910

Gly Tyr Ile Ser Gln Val Val His Lys Ile Cys Glu Leu Val Glu Lys
            915             920             925

Tyr Asp Ala Val Ile Ala Leu Glu Asp Leu Asn Ser Gly Phe Lys Asn
    930             935             940

Ser Arg Val Lys Val Glu Lys Gln Val Tyr Gln Lys Phe Glu Lys Met
945             950             955             960

Leu Ile Asp Lys Leu Asn Tyr Met Val Asp Lys Lys Ser Asn Pro Cys
                965             970             975

Ala Thr Gly Gly Ala Leu Lys Gly Tyr Gln Ile Thr Asn Lys Phe Glu
            980             985             990

Ser Phe Lys Ser Met Ser Thr Gln Asn Gly Phe Ile Phe Tyr Ile Pro
        995             1000            1005

Ala Trp Leu Thr Ser Lys Ile Asp Pro Ser Thr Gly Phe Val Asn
    1010            1015            1020

Leu Leu Lys Thr Lys Tyr Thr Ser Ile Ala Asp Ser Lys Lys Phe
    1025            1030            1035

Ile Ser Ser Phe Asp Arg Ile Met Tyr Val Pro Glu Glu Asp Leu
    1040            1045            1050

Phe Glu Phe Ala Leu Asp Tyr Lys Asn Phe Ser Arg Thr Asp Ala
    1055            1060            1065

Asp Tyr Ile Lys Lys Trp Lys Leu Tyr Ser Tyr Gly Asn Arg Ile
    1070            1075            1080

Arg Ile Phe Arg Asn Pro Lys Lys Asn Asn Val Phe Asp Trp Glu
    1085            1090            1095

Glu Val Cys Leu Thr Ser Ala Tyr Lys Glu Leu Phe Asn Lys Tyr
    1100            1105            1110

Gly Ile Asn Tyr Gln Gln Gly Asp Ile Arg Ala Leu Leu Cys Glu
    1115            1120            1125

Gln Ser Asp Lys Ala Phe Tyr Ser Ser Phe Met Ala Leu Met Ser
    1130            1135            1140

Leu Met Leu Gln Met Arg Asn Ser Ile Thr Gly Arg Thr Asp Val
    1145            1150            1155

Asp Phe Leu Ile Ser Pro Val Lys Asn Ser Asp Gly Ile Phe Tyr
    1160            1165            1170

Asp Ser Arg Asn Tyr Glu Ala Gln Glu Asn Ala Ile Leu Pro Lys
    1175            1180            1185

Asn Ala Asp Ala Asn Gly Ala Tyr Asn Ile Ala Arg Lys Val Leu
    1190            1195            1200

Trp Ala Ile Gly Gln Phe Lys Lys Ala Glu Asp Glu Lys Leu Asp
    1205            1210            1215

```
Lys Val Lys Ile Ala Ile Ser Asn Lys Glu Trp Leu Glu Tyr Ala
1220                1225                1230

Gln Thr Ser Val Lys His Gly Ser Lys Lys Arg Arg Ile Lys Gln
    1235                1240                1245

Asp

<210> SEQ ID NO 20
<211> LENGTH: 23
<212> TYPE: DNA
<213> ORGANISM: Zea mays
<220> FEATURE:
<221> NAME/KEY: misc_feature
<222> LOCATION: (1)..(23)
<223> OTHER INFORMATION: DNA sequence of a guide RNA spacer,
      NR-Zm.Bmr3_90.

<400> SEQUENCE: 20
ggctgcatct gcatagttgt aac                                              23

<210> SEQ ID NO 21
<211> LENGTH: 23
<212> TYPE: DNA
<213> ORGANISM: Zea mays
<220> FEATURE:
<221> NAME/KEY: misc_feature
<222> LOCATION: (1)..(23)
<223> OTHER INFORMATION: DNA sequence of a guide RNA spacer,
      NR-Zm.Bmr3_227.

<400> SEQUENCE: 21
gtaaattcga tctgtgcaca aat                                              23

<210> SEQ ID NO 22
<211> LENGTH: 23
<212> TYPE: DNA
<213> ORGANISM: Zea mays
<220> FEATURE:
<221> NAME/KEY: misc_feature
<222> LOCATION: (1)..(23)
<223> OTHER INFORMATION: DNA sequence of a guide RNA spacer,
      NR-Zm.Brm3_3279.

<400> SEQUENCE: 22
gtgaagaatc gaatcgattc tac                                              23

<210> SEQ ID NO 23
<211> LENGTH: 114
<212> TYPE: DNA
<213> ORGANISM: Artificial
<220> FEATURE:
<223> OTHER INFORMATION: DNA sequence of a guide RNA,
      gRNA-Zm.Bmr3_90_3279.

<400> SEQUENCE: 23
gaatttctac taagtgtaga tggctgcatc tgcatagttg taacaatttc tactaagtgt       60
agatgtgaag aatcgaatcg attctacaat ttctactaag tgtagatttt tttt           114

<210> SEQ ID NO 24
<211> LENGTH: 114
<212> TYPE: DNA
<213> ORGANISM: Artificial
<220> FEATURE:
<223> OTHER INFORMATION: DNA sequence of a guide RNA,
      gRNA-Zm.Bmr3_227_3279.

<400> SEQUENCE: 24
```

```
gaatttctac taagtgtaga tgtaaattcg atctgtgcac aaataatttc tactaagtgt    60
agatgtgaag aatcgaatcg attctacaat ttctactaag tgtagatttt tttt          114

<210> SEQ ID NO 25
<211> LENGTH: 51
<212> TYPE: DNA
<213> ORGANISM: Artificial
<220> FEATURE:
<223> OTHER INFORMATION: DNA sequence of a guide RNA,
      gRNA-Zm.Brm3_2691_2.

<400> SEQUENCE: 25
gaatttctac taagtgtaga tcggcagcgc gtcgtagcag ttcttttttt t              51

<210> SEQ ID NO 26
<211> LENGTH: 51
<212> TYPE: DNA
<213> ORGANISM: Artificial
<220> FEATURE:
<223> OTHER INFORMATION: DNA sequence of a guide RNA,
      gRNA-Zm.Brm3_3170_2.

<400> SEQUENCE: 26
gaatttctac taagtgtaga tgaatccacg acatgcaaga gctctttttt t              51

<210> SEQ ID NO 27
<211> LENGTH: 94
<212> TYPE: DNA
<213> ORGANISM: Artificial
<220> FEATURE:
<223> OTHER INFORMATION: DNA sequence of a guide RNA,
      gRNA-Zm.Brm3_2691_3170.

<400> SEQUENCE: 27
gaatttctac taagtgtaga tcggcagcgc gtcgtagcag ttctaatttc tactaagtgt    60
agatgaatcc acgacatgca agagctcttt tttt                                 94

<210> SEQ ID NO 28
<211> LENGTH: 476
<212> TYPE: DNA
<213> ORGANISM: Zea mays
<220> FEATURE:
<221> NAME/KEY: misc_feature
<222> LOCATION: (1)..(476)
<223> OTHER INFORMATION: DNA sequence of the Zea mays Zm7 genomic region
      targeted for genome editing.

<400> SEQUENCE: 28
gtcaagagca agcaacgaat atgctgtgct actcctctac gtgcggagac gtgttgtatt    60
ttattctatg agcgttattt actgacgtaa ggtatggttt aatcgacgga ttgctatcct   120
ggtcgggctt aattaaggac gttgaagcct ggtaaggtat actaacttag cgtccttcgg   180
aatgggagtg agttgggagg acttgaaaat gtaagaagaa gaaaacaaag catgtgatgg   240
atgcttctgg atgtgcaagc tcagtcttca ttcttcagca gcgcggaaat tggctctaat   300
aacattggtt tatgttgaca gtgctagcga ggacaatgag tcattcgatg tgaaataata   360
ccatctgttc tttatgatag tctatttagt ataatatgat ggcatgccct cttaggcagt   420
agccggccag catttgaaac atggtacttc gttttattta aaaataata agttat        476

<210> SEQ ID NO 29
<211> LENGTH: 23
<212> TYPE: DNA
<213> ORGANISM: Zea mays
```

```
<220> FEATURE:
<221> NAME/KEY: misc_feature
<222> LOCATION: (1)..(23)
<223> OTHER INFORMATION: DNA sequence of a guide RNA spacer, NR-Zm.7.1b.

<400> SEQUENCE: 29
ctgacgtaag gtatggttta atc                                              23

<210> SEQ ID NO 30
<211> LENGTH: 51
<212> TYPE: DNA
<213> ORGANISM: Artificial
<220> FEATURE:
<223> OTHER INFORMATION: DNA sequence of a guide RNA, gRNA-Zm.7.1b.

<400> SEQUENCE: 30
gaatttctac taagtgtaga tctgacgtaa ggtatggttt aatctttttt t               51

<210> SEQ ID NO 31
<211> LENGTH: 23
<212> TYPE: DNA
<213> ORGANISM: Zea mays
<220> FEATURE:
<221> NAME/KEY: misc_feature
<222> LOCATION: (1)..(23)
<223> OTHER INFORMATION: DNA sequence of a guide RNA spacer, NR-Zm.7.1c.

<400> SEQUENCE: 31
gtataatatg atggcatgcc ctc                                              23

<210> SEQ ID NO 32
<211> LENGTH: 51
<212> TYPE: DNA
<213> ORGANISM: Artificial
<220> FEATURE:
<223> OTHER INFORMATION: DNA sequence of a guide RNA, gRNA-Zm.7.1c.

<400> SEQUENCE: 32
gaatttctac taagtgtaga tgtataatat gatggcatgc cctctttttt t               51

<210> SEQ ID NO 33
<211> LENGTH: 94
<212> TYPE: DNA
<213> ORGANISM: Artificial
<220> FEATURE:
<223> OTHER INFORMATION: DNA sequence of a guide RNA, gRNA-7.1c_7.1b.

<400> SEQUENCE: 33
gaatttctac taagtgtaga tgtataatat gatggcatgc cctcaatttc tactaagtgt      60
agatctgacg taaggtatgg tttaatcttt tttt                                  94
```